(12) United States Patent
Hilliges et al.

(10) Patent No.: US 11,215,711 B2
(45) Date of Patent: Jan. 4, 2022

(54) USING PHOTOMETRIC STEREO FOR 3D ENVIRONMENT MODELING

(71) Applicant: Microsoft Technology Licensing, LLC, Redmond, WA (US)

(72) Inventors: Otmar Hilliges, Cambridge (GB); Malte Hanno Weiss, Aachen (DE); Shahram Izadi, Cambridge (GB); David Kim, Cambridge (GB); Carsten Curt Eckard Rother, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/846,180

(22) Filed: Dec. 18, 2017

(65) Prior Publication Data

US 2018/0106905 A1 Apr. 19, 2018

Related U.S. Application Data

(63) Continuation of application No. 13/729,324, filed on Dec. 28, 2012, now Pat. No. 9,857,470.

(51) Int. Cl.
*G01S 17/894* (2020.01)
*G06T 7/586* (2017.01)
(Continued)

(52) U.S. Cl.
CPC ............ *G01S 17/894* (2020.01); *G06T 7/246* (2017.01); *G06T 7/586* (2017.01); *G06T 15/00* (2013.01);
(Continued)

(58) Field of Classification Search
CPC ......... G06T 15/00; G06T 7/586; G06T 7/246; G06T 17/00; G06T 19/006;
(Continued)

(56) References Cited

U.S. PATENT DOCUMENTS 4,215,364 A 7/1980 Takanashi et al.
4,288,078 A 9/1981 Lugo
(Continued)

FOREIGN PATENT DOCUMENTS

CN 1523352 A 8/2004
CN 1734499 A 2/2006
(Continued)

OTHER PUBLICATIONS

"Third Office Action Issued in Chinese Patent Application No. 201380068406.7", dated Feb. 27, 2018, 7 Pages.
(Continued)

*Primary Examiner* — Joseph G Ustaris
*Assistant Examiner* — Matthew David Kim

(57) ABSTRACT

Detecting material properties such reflectivity, true color and other properties of surfaces in a real world environment is described in various examples using a single hand-held device. For example, the detected material properties are calculated using a photometric stereo system which exploits known relationships between lighting conditions, surface normals, true color and image intensity. In examples, a user moves around in an environment capturing color images of surfaces in the scene from different orientations under known lighting conditions. In various examples, surfaces normals of patches of surfaces are calculated using the captured data to enable fine detail such as human hair, netting, textured surfaces to be modeled. In examples, the modeled data is used to render images depicting the scene with realism or to superimpose virtual graphics on the real world in a realistic manner.

20 Claims, 10 Drawing Sheets

(51) Int. Cl.
*G06T 7/246* (2017.01)
*G06T 17/00* (2006.01)
*G06T 19/00* (2011.01)
*H04N 13/20* (2018.01)
*G06T 15/00* (2011.01)

(52) U.S. Cl.
CPC ............ *G06T 17/00* (2013.01); *G06T 19/006* (2013.01); *H04N 13/20* (2018.05); *G06T 2207/10016* (2013.01); *G06T 2207/10024* (2013.01); *G06T 2207/10028* (2013.01); *G06T 2207/30244* (2013.01)

(58) Field of Classification Search
CPC . G06T 2207/10016; G06T 2207/10024; G06T 2207/10028; G06T 2207/30244; H04N 13/20; G01S 17/89
USPC .......................................................... 348/47
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein, Jr. | |
| 5,644,689 A | 7/1997 | Ban et al. | |
| 5,682,196 A | 10/1997 | Freeman | |
| 5,682,229 A | 10/1997 | Wangler | |
| 5,690,582 A | 11/1997 | Ulrich et al. | |
| 5,696,591 A | 12/1997 | Bilhorn et al. | |
| 5,699,444 A | 12/1997 | Palm | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,745,126 A | 4/1998 | Jain et al. | |
| 5,801,717 A | 9/1998 | Engstrom et al. | |
| 5,852,672 A | 12/1998 | Lu | |
| 5,875,108 A | 2/1999 | Hoffberg et al. | |
| 5,877,803 A | 3/1999 | Wee et al. | |
| 5,913,727 A | 6/1999 | Ahdoot | |
| 5,926,568 A | 7/1999 | Chaney et al. | |
| 5,930,379 A | 7/1999 | Rehg et al. | |
| 5,930,392 A | 7/1999 | Ho | |
| 5,933,125 A | 8/1999 | Fernie et al. | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,009,359 A | 12/1999 | El-Hakim et al. | |
| 6,054,991 A | 4/2000 | Crane et al. | |
| 6,057,909 A | 5/2000 | Yahav et al. | |
| 6,058,205 A | 5/2000 | Bahl et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng | |
| 6,084,979 A | 7/2000 | Kanade et al. | |
| 6,098,458 A | 8/2000 | French et al. | |
| 6,100,517 A | 8/2000 | Yahav et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,147,764 A | 11/2000 | Handa | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,229,918 B1 | 5/2001 | Toyama | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,405,151 B1 | 6/2002 | Fujii et al. | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,498,628 B2 | 12/2002 | Iwamura | |
| 6,502,515 B2 | 1/2003 | Burckhardt et al. | |
| 6,503,195 B1 | 1/2003 | Keller et al. | |
| 6,504,569 B1 | 1/2003 | Jasinschi et al. | |
| 6,512,838 B1 | 1/2003 | Rafii et al. | |
| 6,539,931 B2 | 4/2003 | Trajkovic et al. | |
| 6,570,555 B1 | 5/2003 | Prevost et al. | |
| 6,590,669 B1* | 7/2003 | Wagner .................... G06T 7/55 356/601 |
| 6,603,880 B2 | 8/2003 | Sakamoto | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,671,049 B1 | 12/2003 | Silver | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,741,756 B1 | 5/2004 | Toyama et al. | |
| 6,765,726 B2 | 7/2004 | French et al. | |

(56) References Cited

U.S. PATENT DOCUMENTS

| | | |
|---|---|---|
| 6,771,277 B2 | 8/2004 | Ohba |
| 6,781,618 B2 | 8/2004 | Beardsley |
| 6,788,809 B1 | 9/2004 | Grzeszczuk et al. |
| 6,801,637 B2 | 10/2004 | Voronka et al. |
| 6,823,204 B2 | 11/2004 | Grass et al. |
| 6,850,635 B2 | 2/2005 | Gerard et al. |
| 6,873,723 B1 | 3/2005 | Aucsmith et al. |
| 6,876,496 B2 | 4/2005 | French et al. |
| 6,879,709 B2 | 4/2005 | Tian et al. |
| 6,937,742 B2 | 8/2005 | Roberts et al. |
| 6,940,538 B2 | 9/2005 | Rafey et al. |
| 6,950,534 B2 | 9/2005 | Cohen et al. |
| 6,963,338 B1 | 11/2005 | Bachelder et al. |
| 7,003,134 B1 | 2/2006 | Covell et al. |
| 7,006,236 B2 | 2/2006 | Tomasi et al. |
| 7,034,818 B2 | 4/2006 | Perry et al. |
| 7,035,431 B2 | 4/2006 | Blake et al. |
| 7,036,094 B1 | 4/2006 | Cohen et al. |
| 7,038,855 B2 | 5/2006 | French et al. |
| 7,039,239 B2 | 5/2006 | Loui et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,098,435 B2 | 8/2006 | Mueller et al. |
| 7,113,918 B1 | 9/2006 | Ahmad et al. |
| 7,121,946 B2 | 10/2006 | Paul et al. |
| 7,135,992 B2 | 11/2006 | Karlsson et al. |
| 7,151,530 B2 | 12/2006 | Roeber et al. |
| 7,158,680 B2 | 1/2007 | Pace |
| 7,162,075 B2 | 1/2007 | Littlefield et al. |
| 7,167,578 B2 | 1/2007 | Blake et al. |
| 7,170,492 B2 | 1/2007 | Bell |
| 7,184,047 B1 | 2/2007 | Crampton |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,263,509 B2 | 8/2007 | Lee et al. |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,319,836 B2 | 1/2008 | Kuroda |
| 7,327,362 B2 | 2/2008 | Grau |
| 7,340,077 B2 | 3/2008 | Gokturk et al. |
| 7,340,089 B2 | 3/2008 | Nair et al. |
| 7,348,963 B2 | 3/2008 | Bell |
| 7,359,121 B2 | 4/2008 | French et al. |
| 7,366,325 B2 | 4/2008 | Fujimura et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,451,123 B2 | 11/2008 | Platt et al. |
| 7,452,275 B2 | 11/2008 | Kuraishi |
| 7,453,472 B2 | 11/2008 | Goede et al. |
| 7,460,690 B2 | 12/2008 | Cohen et al. |
| 7,489,812 B2 | 2/2009 | Fox et al. |
| 7,519,206 B2 | 4/2009 | Mulet-Parada et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,583,274 B2 | 9/2009 | Roberts et al. |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,447 B2 | 12/2009 | Marsh et al. |
| 7,648,460 B2 | 1/2010 | Simopoulos et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,697,748 B2 | 4/2010 | Dimsdale et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,707,162 B2 | 4/2010 | Naphade et al. |
| 7,710,391 B2 | 5/2010 | Bell et al. |
| 7,728,839 B2 | 6/2010 | Yang et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| 7,855,732 B2 | 12/2010 | Williams et al. |
| 7,860,301 B2 | 12/2010 | Se et al. |
| RE42,256 E | 3/2011 | Edwards |
| 7,898,522 B2 | 3/2011 | Hildreth et al. |
| 7,925,081 B2 | 4/2011 | Gupta et al. |
| 7,974,443 B2 | 7/2011 | Kipman et al. |
| 8,009,880 B2 | 8/2011 | Zhang et al. |
| 8,031,909 B2 | 10/2011 | Se et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,103,109 B2 | 1/2012 | Winn et al. |
| 8,144,931 B1 | 3/2012 | Hartman et al. |
| 8,147,066 B2 | 4/2012 | Nozaki et al. |
| 8,149,268 B1* | 4/2012 | Meyers ........... H04N 13/261 348/42 |
| 8,154,590 B2 | 4/2012 | Kressel et al. |
| 8,270,733 B2 | 9/2012 | Cobb et al. |
| 8,277,315 B2 | 10/2012 | Burak et al. |
| 8,290,249 B2 | 10/2012 | Mathe et al. |
| 8,379,919 B2 | 2/2013 | Bronder et al. |
| 8,401,225 B2 | 3/2013 | Newcombe et al. |
| 8,448,056 B2 | 5/2013 | Pulsipher et al. |
| 8,503,720 B2 | 8/2013 | Shotton et al. |
| 8,570,320 B2 | 10/2013 | Izadi et al. |
| 8,587,583 B2 | 11/2013 | Newcombe et al. |
| 8,711,206 B2 | 4/2014 | Newcombe et al. |
| 9,137,511 B1* | 9/2015 | LeGrand, III ..... G01B 11/2545 |
| 9,165,199 B2 | 10/2015 | Zhu et al. |
| 9,247,238 B2 | 1/2016 | Izadi et al. |
| 9,256,982 B2 | 2/2016 | Sharp et al. |
| 9,262,673 B2 | 2/2016 | Shotton et al. |
| 9,940,553 B2 | 4/2018 | Shotton et al. |
| 2002/0024517 A1 | 2/2002 | Yamaguchi et al. |
| 2002/0043632 A1 | 4/2002 | Miramonti et al. |
| 2002/0069013 A1 | 6/2002 | Navab et al. |
| 2002/0112024 A1 | 8/2002 | Yang et al. |
| 2002/0118869 A1 | 8/2002 | Knoplioch et al. |
| 2002/0186216 A1 | 12/2002 | Baumberg et al. |
| 2003/0043270 A1 | 3/2003 | Rafey et al. |
| 2003/0067461 A1 | 4/2003 | Fletcher et al. |
| 2003/0161500 A1 | 8/2003 | Blake et al. |
| 2003/0221163 A1 | 11/2003 | Glover et al. |
| 2004/0023612 A1 | 2/2004 | Kriesel |
| 2004/0075738 A1 | 4/2004 | Burke et al. |
| 2004/0104935 A1 | 6/2004 | Williamson et al. |
| 2004/0136583 A1 | 7/2004 | Harada et al. |
| 2004/0145722 A1 | 7/2004 | Uomori et al. |
| 2004/0167667 A1 | 8/2004 | Goncalves et al. |
| 2004/0179728 A1 | 9/2004 | Littlefield et al. |
| 2004/0207597 A1 | 10/2004 | Marks |
| 2004/0233287 A1 | 11/2004 | Schnell |
| 2004/0239670 A1 | 12/2004 | Marks |

(56) References Cited

U.S. PATENT DOCUMENTS

| | | |
|---|---|---|
| 2005/0010445 A1 | 1/2005 | Krishnan et al. |
| 2005/0059488 A1 | 3/2005 | Larsen et al. |
| 2005/0078178 A1 | 4/2005 | Brown et al. |
| 2005/0082480 A1 | 4/2005 | Wagner et al. |
| 2005/0174473 A1* | 8/2005 | Morgan ............. H05B 33/0803 |
| | | 348/370 |
| 2005/0238200 A1 | 10/2005 | Gupta et al. |
| 2006/0006309 A1 | 1/2006 | Dimsdale et al. |
| 2006/0018539 A1* | 1/2006 | Sato ..................... G06K 9/36 |
| | | 382/173 |
| 2006/0064017 A1 | 3/2006 | Krishnan et al. |
| 2006/0110021 A1 | 5/2006 | Luo et al. |
| 2006/0188144 A1 | 8/2006 | Sasaki et al. |
| 2006/0221072 A1* | 10/2006 | Se ..................... G01C 11/06 |
| | | 345/420 |
| 2006/0221250 A1 | 10/2006 | Rossbach et al. |
| 2006/0239553 A1 | 10/2006 | Florin et al. |
| 2006/0239558 A1 | 10/2006 | Rafii et al. |
| 2006/0252541 A1 | 11/2006 | Zalewski et al. |
| 2006/0268406 A1 | 11/2006 | Mcmahon et al. |
| 2007/0013718 A1 | 1/2007 | Ohba |
| 2007/0016418 A1 | 1/2007 | Mehrotra et al. |
| 2007/0031001 A1 | 2/2007 | Hamanaka |
| 2007/0052807 A1 | 3/2007 | Zhou et al. |
| 2007/0053563 A1 | 3/2007 | Tu et al. |
| 2007/0055153 A1 | 3/2007 | Simopoulos et al. |
| 2007/0060336 A1 | 3/2007 | Marks et al. |
| 2007/0081712 A1 | 4/2007 | Huang et al. |
| 2007/0098222 A1 | 5/2007 | Porter et al. |
| 2007/0116356 A1 | 5/2007 | Gong et al. |
| 2007/0156286 A1 | 7/2007 | Yamauchi |
| 2007/0188501 A1 | 8/2007 | Yee et al. |
| 2007/0195173 A1 | 8/2007 | Nozaki et al. |
| 2007/0216894 A1 | 9/2007 | Garcia et al. |
| 2007/0217676 A1 | 9/2007 | Grauman et al. |
| 2007/0229498 A1 | 10/2007 | Matusik et al. |
| 2007/0260492 A1 | 11/2007 | Feied et al. |
| 2007/0260984 A1 | 11/2007 | Marks et al. |
| 2007/0276214 A1 | 11/2007 | Dachille et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0027591 A1 | 1/2008 | Lenser et al. |
| 2008/0037850 A1 | 2/2008 | Assmann et al. |
| 2008/0060854 A1 | 3/2008 | Perlin |
| 2008/0062257 A1 | 3/2008 | Corson |
| 2008/0075361 A1 | 3/2008 | Winn et al. |
| 2008/0075367 A1 | 3/2008 | Winn et al. |
| 2008/0100620 A1 | 5/2008 | Nagai et al. |
| 2008/0126937 A1 | 5/2008 | Pachet |
| 2008/0130985 A1 | 6/2008 | Park et al. |
| 2008/0134102 A1 | 6/2008 | Movold et al. |
| 2008/0137101 A1 | 6/2008 | Spence et al. |
| 2008/0137956 A1 | 6/2008 | Yang et al. |
| 2008/0152191 A1 | 6/2008 | Fujimura et al. |
| 2008/0152218 A1 | 6/2008 | Okada |
| 2008/0215972 A1 | 9/2008 | Zalewski et al. |
| 2008/0215973 A1 | 9/2008 | Zalewski et al. |
| 2008/0304707 A1 | 12/2008 | Oi et al. |
| 2008/0310677 A1 | 12/2008 | Weismuller et al. |
| 2008/0310757 A1 | 12/2008 | Wolberg et al. |
| 2008/0317331 A1 | 12/2008 | Winn et al. |
| 2009/0003652 A1 | 1/2009 | Steinberg et al. |
| 2009/0010507 A1 | 1/2009 | Geng |
| 2009/0033655 A1 | 2/2009 | Boca et al. |
| 2009/0034622 A1 | 2/2009 | Huchet et al. |
| 2009/0048482 A1 | 2/2009 | Hong et al. |
| 2009/0074238 A1 | 3/2009 | Pfister et al. |
| 2009/0096807 A1 | 4/2009 | Silverstein et al. |
| 2009/0141933 A1 | 6/2009 | Wagg |
| 2009/0167679 A1 | 7/2009 | Klier et al. |
| 2009/0175538 A1 | 7/2009 | Bronstein et al. |
| 2009/0175540 A1 | 7/2009 | Dariush et al. |
| 2009/0221368 A1 | 9/2009 | Yen et al. |
| 2009/0231425 A1 | 9/2009 | Zalewski |
| 2009/0244065 A1 | 10/2009 | Storti et al. |
| 2009/0244097 A1 | 10/2009 | Estevez |
| 2009/0244309 A1 | 10/2009 | Maison et al. |
| 2009/0252423 A1 | 10/2009 | Zhu et al. |
| 2009/0279756 A1 | 11/2009 | Gindele et al. |
| 2009/0290811 A1 | 11/2009 | Imai |
| 2009/0324093 A1 | 12/2009 | Miarecki et al. |
| 2010/0008581 A1 | 1/2010 | Bressan |
| 2010/0045701 A1 | 2/2010 | Scott et al. |
| 2010/0080415 A1 | 4/2010 | Qureshi et al. |
| 2010/0080434 A1 | 4/2010 | Seifert et al. |
| 2010/0085352 A1 | 4/2010 | Zhou et al. |
| 2010/0085353 A1 | 4/2010 | Zhou et al. |
| 2010/0093435 A1 | 4/2010 | Glaser et al. |
| 2010/0094460 A1 | 4/2010 | Choi et al. |
| 2010/0098328 A1 | 4/2010 | Se et al. |
| 2010/0103196 A1 | 4/2010 | Kumar et al. |
| 2010/0104184 A1 | 4/2010 | Bronstein et al. |
| 2010/0111370 A1 | 5/2010 | Black et al. |
| 2010/0124377 A1 | 5/2010 | Yu et al. |
| 2010/0158352 A1 | 6/2010 | Yu et al. |
| 2010/0194863 A1 | 8/2010 | Lopes et al. |
| 2010/0197390 A1 | 8/2010 | Craig et al. |
| 2010/0197393 A1 | 8/2010 | Geiss |
| 2010/0197400 A1 | 8/2010 | Geiss |
| 2010/0201808 A1 | 8/2010 | Hsu |
| 2010/0223276 A1 | 9/2010 | Al-shameri et al. |
| 2010/0260396 A1 | 10/2010 | Brandt et al. |
| 2010/0278384 A1 | 11/2010 | Shotton et al. |
| 2010/0278420 A1 | 11/2010 | Shet et al. |
| 2010/0281432 A1 | 11/2010 | Geisner et al. |
| 2010/0295783 A1 | 11/2010 | El dokor et al. |
| 2010/0296724 A1 | 11/2010 | Chang et al. |
| 2010/0302247 A1 | 12/2010 | Perez et al. |
| 2010/0302395 A1 | 12/2010 | Mathe et al. |
| 2010/0303289 A1 | 12/2010 | Polzin et al. |
| 2011/0034244 A1 | 2/2011 | Marks et al. |
| 2011/0085705 A1 | 4/2011 | Izadi et al. |
| 2011/0096832 A1 | 4/2011 | Zhang et al. |
| 2011/0188715 A1 | 8/2011 | Shotton et al. |
| 2011/0210915 A1 | 9/2011 | Shotton et al. |
| 2011/0228997 A1 | 9/2011 | Sharp et al. |
| 2011/0234481 A1 | 9/2011 | Katz et al. |
| 2011/0243386 A1 | 10/2011 | Sofka et al. |
| 2011/0249865 A1 | 10/2011 | Lee et al. |
| 2011/0267344 A1 | 11/2011 | Germann et al. |
| 2011/0293180 A1 | 12/2011 | Criminisi et al. |
| 2011/0304705 A1* | 12/2011 | Kantor ................. A61B 5/0059 |
| | | 348/49 |
| 2011/0306398 A1 | 12/2011 | Boch et al. |
| 2012/0014559 A1 | 1/2012 | Suehling et al. |
| 2012/0056982 A1 | 3/2012 | Katz et al. |
| 2012/0062719 A1* | 3/2012 | Debevec ............. H04N 5/2251 |
| | | 348/77 |
| 2012/0075343 A1 | 3/2012 | Chen et al. |
| 2012/0120199 A1 | 5/2012 | Ben Himane |
| 2012/0128201 A1 | 5/2012 | Brickhill |
| 2012/0147149 A1 | 6/2012 | Liu et al. |
| 2012/0147152 A1 | 6/2012 | Vogiatis et al. |
| 2012/0148162 A1 | 6/2012 | Zhang et al. |
| 2012/0163656 A1 | 6/2012 | Wang et al. |
| 2012/0163723 A1 | 6/2012 | Balan et al. |
| 2012/0194516 A1 | 8/2012 | Newcombe et al. |
| 2012/0194517 A1 | 8/2012 | Izadi et al. |
| 2012/0194644 A1 | 8/2012 | Newcombe et al. |
| 2012/0194650 A1 | 8/2012 | Izadi et al. |
| 2012/0195471 A1 | 8/2012 | Newcombe et al. |
| 2012/0196679 A1 | 8/2012 | Newcombe et al. |
| 2012/0212509 A1* | 8/2012 | Benko .................... G03B 35/00 |
| | | 345/633 |
| 2012/0239174 A1 | 9/2012 | Shotton et al. |
| 2012/0268940 A1 | 10/2012 | Sahlin et al. |
| 2012/0300979 A1 | 11/2012 | Pirchheim et al. |
| 2012/0314039 A1* | 12/2012 | You ..................... H04N 5/23209 |
| | | 348/49 |
| 2013/0051626 A1 | 2/2013 | Abadpour et al. |
| 2013/0077059 A1 | 3/2013 | Marti et al. |

(56) References Cited

U.S. PATENT DOCUMENTS

| | | | |
|---|---|---|---|
| 2013/0243313 A1* | 9/2013 | Civit .................. | G06T 5/002 |
| | | | 382/164 |
| 2013/0251246 A1 | 9/2013 | Tang et al. | |
| 2013/0265502 A1 | 10/2013 | Huebner | |
| 2013/0266182 A1 | 10/2013 | Shotton et al. | |
| 2013/0300740 A1* | 11/2013 | Snyder ............... | G06F 3/016 |
| | | | 345/420 |
| 2013/0316282 A1 | 11/2013 | Ishigami et al. | |
| 2014/0079314 A1 | 3/2014 | Yakubovich et al. | |
| 2014/0241617 A1 | 8/2014 | Shotton et al. | |
| 2015/0029222 A1 | 1/2015 | Hofmann | |
| 2016/0163054 A1 | 6/2016 | Izadi et al. | |
| 2016/0171295 A1 | 6/2016 | Shotton et al. | |

FOREIGN PATENT DOCUMENTS

| | | |
|---|---|---|
| CN | 1738426 A | 2/2006 |
| CN | 1802586 A | 7/2006 |
| CN | 1820509 A | 7/2006 |
| CN | 101257641 A | 9/2008 |
| CN | 101305401 A | 11/2008 |
| CN | 101377812 A | 3/2009 |
| CN | 201254344 Y | 6/2009 |
| CN | 101605211 A | 12/2009 |
| CN | 101254344 B | 6/2010 |
| CN | 101872491 A | 10/2010 |
| CN | 102129708 A | 7/2011 |
| CN | 102184558 A | 9/2011 |
| CN | 102236912 A | 11/2011 |
| CN | 102289815 A | 12/2011 |
| CN | 102609942 A | 7/2012 |
| CN | 102622762 A | 8/2012 |
| CN | 102622776 A | 8/2012 |
| CN | 102681661 A | 9/2012 |
| EP | 583061 A2 | 2/1994 |
| GB | 2411532 A | 8/2005 |
| GB | 2458305 A | 9/2009 |
| JP | 8044490 A | 2/1996 |
| JP | 2003141569 A | 5/2003 |
| JP | 2005210722 A | 8/2005 |
| JP | 2009113711 A | 5/2009 |
| JP | 2009536406 A | 10/2009 |
| JP | 2010079453 A | 4/2010 |
| JP | 2010279023 A | 12/2010 |
| KR | 20100131060 A | 12/2010 |
| TW | 200947346 A | 11/2009 |
| WO | 9310708 A1 | 6/1993 |
| WO | 9717598 A1 | 5/1997 |
| WO | 9915863 A1 | 4/1999 |
| WO | 9935855 A1 | 7/1999 |
| WO | 9944698 A2 | 9/1999 |
| WO | 0120914 A2 | 3/2001 |
| WO | 0159975 A3 | 1/2002 |
| WO | 02082249 A2 | 10/2002 |
| WO | 03001722 A3 | 3/2003 |
| WO | 03046706 A1 | 6/2003 |
| WO | 03054683 A3 | 12/2003 |
| WO | 03071410 A3 | 3/2004 |
| WO | 03073359 A3 | 3/2004 |
| WO | 2007132451 A2 | 11/2007 |
| WO | 2009059065 A1 | 5/2009 |
| WO | 2009131539 A1 | 10/2009 |
| WO | 2010095080 A1 | 8/2010 |
| WO | 2010140613 A1 | 12/2010 |

OTHER PUBLICATIONS

Gemeiner, et al. "Improving Localization Robustness in Monocular SLAM Using a High-Speed Camera", In Proceedings of Robotics: Science and Systems, Jun. 25, 2008, 8 Pages.

"Channel Access Method", Retrieved From: <<http://en.wikipedia.org/wiki/Multiple_access_protocol#Circuit_mode_and_channelization_methods>>, Oct. 26, 2011, 7 Pages.

"Matt Cutts: Gadgets, Google, and SEO", Retrieved from <<https://web.archive.org/web/20101129163015/http://www.mattcutts.com/blog/>>, Nov. 18, 2010, 10 Pages.

"Simulation and Training", In Division Incorporated, Jan. 1994, 6 Pages.

"Virtual High Anxiety", In Proceedings of the Tech Update, Aug. 1995, 1 Page.

"Final Office Action Issued in U.S. Appl. No. 13/729,324", dated Nov. 13, 2015, 16 Pages.

"Final Office Action Issued in U.S. Appl. No. 13/729,324", dated Nov. 2, 2016, 18 Pages.

"Non-Final Office Action Issued in U.S. Appl. No. 13/729,324", dated Jun. 2, 2015, 15 Pages.

"Non-Final Office Action Issued in U.S. Appl. No. 13/729,324", dated Apr. 6, 2017, 5 Pages.

"Notice of Allowance Issued in U.S. Appl. No. 13/729,324", dated Aug. 21, 2017, 8 Pages.

"First Office Action and Search Report Issued in Chinese Patent Application No. 201380068406.7", dated Mar. 2, 2017, 13 Pages.

"Second Office Action Issued in Chinese Patent Application No. 201380068406.7", dated Sep. 20, 2017, 7 Pages.

Aggarwal, et al., "Human Motion Analysis: A Review", In Proceedings of Nonrigid and Articulated Motion Workshop, Jun. 16, 1997, 13 Pages.

Anderson, et al., "Augmenting Depth Camera Output Using Photometric Stereo", In Conference on Machine Vision Applications, Jun. 13, 2011, pp. 369-372.

Azarbayejani, et al., "Visually Controlled Graphics", In IEEE Transactions on Pattern Analysis and Machine Intelligence, vol. 15, Issue 6, Jun. 1, 1993, 4 Pages.

Blais, et al., "Registering Multiview Range Data to Create 3D Computer Objects", In Proceedings of IEEE Transactions on Pattern Analysis and Machine Intelligence, vol. 17, Issue 8, Aug. 1, 1995, pp. 820-824.

Breen, et al., "Interactive Occlusion and Collusion of Real and Virtual Objects in Augmented Reality", In Technical Report of European Computer Industry Research Center, Jan. 1995, 22 Pages.

Breiman, Leo, "Random Forests", In Proceedings of In Machine Learning, vol. 45, Issue 1, Oct. 2001, pp. 5-32.

Brogan, et al., "Dynamically Simulated Characters in Virtual Environments", In Proceedings of the IEEE Computer Graphics and Applications, vol. 18, Issue 5, Sep. 1998, 12 Pages.

Campbell, et al., "Automatic 3D Object Segmentation in Multiple Views using Volumetric Graph-Cuts", In Journal Image and Vision Computing, vol. 28, Issue 1, Jan. 1, 2010, 10 Pages.

Celix, et al., "Monocular Vision SLAM for Indoor Aerial Vehicles", In Proceedings of the IEEE/RSJ Inter-national Conference on Intelligent Robots and Systems, Oct. 11, 2009, 8 Pages.

Chen, et al., "Object Modeling by Registration of Multiple Range Images", In Journal Image and Vision Computing—Special Issue: Range Image Understanding Archive, vol. 10, Issue 3, Apr. 1, 1992, pp. 2724-2729.

Cohen, et al., "Interactive Fluid-Particle Simulation using Translating Eulerian Grids", In Proceedings of the ACM SIGGRAPH Symposium on Interactive 3D Graphics and Games, Feb. 19, 2010, 8 Pages.

Curless, et al., "A Volumetric Method for Building Complex Models from Range Images", In Proceedings of the 23rd Annual Conference on Computer Graphics and Interactive Techniques, Aug. 1, 1996, pp. 303-312.

Davison, et al., "Mobile Robot Localisation using Active Vision", In Proceedings of 5th European Conference on Computer Vision, vol. II, Jun. 1998, pp. 809-825.

Debevec, et al., "Acquiring the Reflectance Field of a Human Face", In Proceedings of the 27th Annual Conference on Computer Graphics and Interactive Techniques, Apr. 4, 2004, 12 Pages.

Einarsson, et al., "Relighting Human Locomotion with Flowed Reflectance Fields", In the Proceedings of Rendering Techniques, Jun. 26, 2007, 13 Pages.

Elfes, et al., "Sensor Integration for Robot Navigation: Combining Sonar and Stereo Range Data in a Grid-Based Representation", In Proceedings of the 26th Conference on Decision and Control, Dec., Jan. 1987, pp. 1802-1807.

(56) References Cited

OTHER PUBLICATIONS

Fisher, et al., "Virtual Environment Display System", In Proceedings of the ACM Workshop on Interactive 3D Graphics, Oct. 23, 1986, 12 Pages.

Fraham, et al., "Building Rome on a Cloudless Day", In Proceedings of European Conference on Computer Vision: Part IV, Sep. 2010, pp. 368-381.

Freeman, et al., "Television Control by Hand Gestures", In Proceedings of the IEEE International Workshop on Automatic Face and Gesture Recognition, Jun. 26, 1995, 5 Pages.

Furukawa, et al., "Towards Internet-scale Multi-view Stereo", In Proceedings of Conference on Computer Vision and Pattern Recognition, Jun. 2010, pp. 1434-1441.

Goesele, et al., "Multi-View Stereo Revisited", In Proceedings of Conference on Computer Vision and Pattern Recognition, vol. 2, Jan. 2006, pp. 2402-2409.

Granieri, et al., "Simulating Humans in VR", Published in the British Computer Society, Academic Press, Oct. 12, 1994, 15 Pages.

Hadwiger, et al., "Advanced Illumination Techniques for GPU-Based Volume Raycasting", In International Conference on Computer Graphics and Interactive Techniques, Aug. 2009, pp. 1-56.

Harada, Takahiro, "Real-Time Rigid Body Simulation on GPUs", Retrieved From<<http://http.developer.nvidia.Com/GPUGems3/gpugems3_ch29.html>>Nvidia, GPU Gems 3, Chapter 29, 2008, 25 Pages.

Hasegawa, et al., "Human-Scale Haptic Interaction with a Reactive Virtual Human in a Real-Time Physics Simulator", In Magazine—Computers in Entertainment (CIE)—Theoretical and Practical Computer Applications in Entertainment, vol. 4, Issue 3, Jul. 1, 2006, 12 Pages.

He, Lei, "Generation of Human Body Models", In Thesis Submitted in Partial Fulfillment of the Requirements for the Degree of Master of Science in Computer Science, Apr. 2005, 111 Pages.

Henry, et al., "Create Alert RGB-D Mapping: Using Depth Cameras for Dense 3D Modeling of Indoor Environments", In Proceedings of the 12th International Symposium on Experimental Robotics, Dec. 2010, 15 Pages.

Henry, et al., "RGB-D Mapping: Using Depth Cameras for Dense 3D Modeling of Indoor Environments", In the 12th International Symposium on Experimental Robotics, Dec. 18, 2010, 15 Pages.

Henry, et al., "RGB-D Mapping: Using Kinect-style Depth Cameras for Dense 3D Modeling of Indoor Environments", In International Journal of Robotic Research, vol. 31, Issue 5, Feb. 10, 2012, 17 Pages.

Higo, et al., "A Hand-held Photometric Stereo Camera for 3-D Modeling", In Proceedings of IEEE 12th International Conference on Computer Vision, Sep. 29, 2009, pp. 1234-1241.

Hongo, et al., "Focus of Attention for Face and Hand Gesture Recognition Using Multiple Cameras", In 4th IEEE International Conference on Automatic Face and Gesture Recognition, Grenoble, Mar. 2000, pp. 156-161.

Isard, et al., "Condensation—Conditional Density Propagation for Visual Tracking", In Proceedings of the International Journal of Computer Vision, vol. 29, Issue 01, Aug. 1998, pp. 5-28.

Izadi, et al., "KinectFusion: Real-time 3D Reconstruction and Interaction Using a Moving Depth Camera", In Proceedings of the 24th Annual ACM Symposium on User Interface Software and Technology, Oct. 16, 2011, 10 Pages.

Kanade, et al., "A Stereo Machine for Video-rate Dense Depth Mapping and Its New Applications", In Proceedings of the IEEE Computer Society Conference on Computer Vision and Pattern Recognition, Jan. 1996, pp. 196-202.

Klein, et al., "Parallel Tracking and Mapping for Small AR Workspaces", In IEEE International Symposium on Mixed and Augmented Reality, Nov. 2007, pp. 225-234.

Kohler, Markus, "Special Topics of Gesture Recognition Applied in Intelligent Home Environments", In Proceedings of the International Gesture Workshop, Sep. 1998, 12 Pages.

Kohler, Markus, "Technical Details and Ergonomical Aspects of Gesture Recognition Applied in Intelligent Home Environments", Retrieved from:<<https://pdfs.semanticscholar.org/0210/daa859d8574b1e1f98f809814e83022c75e4.pdf>>, Jan. 1997, 35 Pages.

Kohler, Markus, "Vision Based Remote Control in Intelligent Home Environments", In 3D Image Analysis and Synthesis, vol. 96, Nov. 1996, 8 Pages.

Krainin, et al., "Manipulator and Object Tracking for In Hand Model Acquisition", In IEEE International Conference on Robots and Automation, May 7, 2010, 8 Pages.

Lai, et al., "Sparse Distance Learning for Object Recognition Combining RGB and Depth Information", In IEEE International Conference on Robotics and Automation, May 9, 2011, pp. 4007-4013.

Le, Grand, "Broad-Phase Collision Detection with CUDA", Retrieved From<<http://http.developer.nvidia.com/GPUGems3/gpugems3_ch32.html>>, Nvidia, GPU Gems 3, Chapter 32, Jan. 2008, pp. 1-24.

Levoy, et al., "The Digital Michelangelo Project: 3D Scanning of Large Statues", In Proceedings of the 27th Annual Conference on Computer Graphics and Interactive Techniques, Jul. 2000, pp. 131-144.

Livingston, Mark Alan, "Vision-based Tracking with Dynamic Structured Light for Video See-through Augmented Reality", A Dissertation Submitted to the Faculty of The University of North Carolina at Chapel Hill in Partial Fulfillment of the Requirements for the Degree of Doctor of Philosophy in the Department of Computer Science, Jan. 1998, 145 Pages.

Lorensen, et al., "Marching Cubes: A High Resolution 3D Surface Construction Algorithm", In Proceedings of 14th Annual Conference on Computer Graphics and Interactive Techniques, vol. 21, Issue 4, Aug. 1, 1987, pp. 163-169.

Mair, et al., "Efficient Camera-based Pose Estimation for Real-time Applications", In Proceedings of International Conference on Intelligent Robots and Systems, Oct. 10, 2009, 8 Pages.

Miyagawa, et al., "CCD-Based Range Finding Sensor", In Proceedings of IEEE Transactions on Electron Devices, vol. 44, Issue 10, Oct. 1997, pp. 1648-1652.

Newcombe, et al., "KinectFusion: Real-Time Dense Surface Mapping and Tracking", In Proceedings of the 10th IEEE International Symposium on Mixed and Augmented Reality, Oct. 26, 2011, 10 Pages.

Newcombe, et al., "Live Dense Reconstruction with a Single Moving Camera", In IEEE Conference on Computer Vision and Pattern Recognition, Jun. 13, 2010, pp. 1498-1505.

Nguyen, et al., "GPU Gems 3. Addison-Wesley Professional", Retrieved From: <<http://http.developer.nvidia.com/GPUGems3/gpugems3_pref01.html>>, Jan. 2007, 3 Pages.

Osher, et al., "Level Set Methods and Dynamic Implicit Surfaces, Signed Distance Functions", In Book Level Set Methods and Dynamic Implicit Surfaces, Series Title Applied Mathematical Sciences, vol. 153, Apr. 6, 2006, pp. 17-22.

Parker, et al., "Interactive Ry Tracing for Isosurface Rendering", In the IEEE Proceedings of Visualization, Oct. 24, 1998, pp. 233-238.

Paul, et al., "A Method for Registration of 3-D Shapes", In Proceedings of IEEE Transactions on Pattern Analysis and Machine Intelligence—Special Issue on Interpretation of 3-D Scenes—Part-II, vol. 14, Issue 2, Feb. 1, 1992, pp. 239-256.

Pavlovic, et al., "Visual Interpretation of Hand Gestures for Human-Computer Interaction: A Review", In Proceedings of IEEE Transactions on Pattern Analysis and Machine Intelligence, vol. 19, Issue 7, Jul. 1, 1997, pp. 677-695.

"International Search Report and Written Opinion Issued in PCT Application No. PCT/US2013/077736", dated Mar. 27, 2014, 15 Pages.

"International Search Report & Written Opinion Issued in PCT Application No. PCT/US2014/016749", dated May 12, 2014, 8 Pages.

Pollefeys, et al., "Detailed Real-Time Urban 3D Reconstruction from Video", In International Journal of Computer Vision, vol. 78, Issue 2-3, Jul. 2008, pp. 143-167.

Purcell, et al., "Ray Tracing on Programmable Graphics Hardware", In Proceedings of the 29th Annual Conference on Computer Graphics and Interactive Techniques, vol. 1, Issue 3, Jun. 23, 2002, pp. 703-712.

(56) References Cited

OTHER PUBLICATIONS

Rosenhahn, et al., "Automatic Human Model Generation", In International Conference on Computer Analysis of Images and Patterns, Sep. 5, 2005, pp. 41-48.
Rusinkiewicz, et al., "Efficient Variants of the ICP Algorithm", In Third International Conference on 3-D Digital Imaging and Modeling, Jan. 2001, pp. 145-152.
Rusinkiewicz, et al., "Real-Time 3D Model Acquisition", In Proceedings of the 29th Annual Conference on Computer Graphics and Interactive Techniques, Jul. 2002, pp. 438-446.
Seitz, Steven M, "A Comparison and Evaluation of Mulit-View Stereo Reconstruction Algorithms", In Proceedings of IEEE Computer Society Conference on Computer Vision and Pattern Recognition, Jun. 17, 2006, 8 Pages.
Shao, et al., "An Open System Architecture for a Multimedia and Multimodal User Interface", In Proceedings of 3rd TIDE Congress, Aug. 24, 1998, 8 Pages.
Sheridan, et al., "Virtual Reality Check", In Proceedings of the Technology Review, vol. 96, Issue 7, Oct. 1993, 9 Pages.
Stein, et al., "Structural Indexing: Efficient 3-D Object Recognition", In IEEE Transactions on Pattern Analysis and Machine Intelligence, vol. 14, Issue 2, Feb. 1992, pp. 125-145.
Stevens, Jane E., "Flights into Virtual Reality Treating Real World Disorders", In Proceedings of the Washington Post, Science Psychology, Mar. 27, 1995, 2 Pages.
Stuhmer, et al., "Real-Time Dense Geometry from a Handheld Camera", In Joint Pattern Recognition Symposium, Sep. 22, 2010, pp. 11-20.
Thrun, et al., "Probabilistic Robotics", In The MIT Press, Chapter 9, Sep. 2005, pp. 281-335.
Veas, et al., "Creating Meaningful Environment Models for Augmented Reality", In Proceedings of IEEE Virtual Reality Conference, Mar. 8, 2008, 2 Pages.
Vogiatzis, et al., "Reconstructing Relief Surfaces", In Image and Vision Computing, vol. 26, Issue 3, Mar. 1, 2008, pp. 397-404.
Wagner, et al., "Pose Tracking from Natural Features on Mobile Phones", In Proceedings of 7th IEEE/ACM International Symposium on Mixed and Augmented Reality, Sep. 15, 2008, 10 Pages.
Wren, et al., "Pfinder: Real-Time Tracking of the Human Body", In IEEE Transactions on Pattern Analysis and Machine Intelligence, vol. 19, Issue 7, Jul. 1997, 6 Pages.
Wurm, et al., "OctoMap: A Probabilistic, Flexible, and Compact 3D Map Representation for Robotic Systems", In Proceedings of Workshop on Best Practice in 3D Perception and Modeling for Mobile Manipulation, May 2010, 8 Pages.
Zach, et al., "A Globally Optimal Algorithm for Robust TV-L1 Range Image Integration", In IEEE 11th International Conference on Computer Vision, Oct. 2007, 8 Pages.
Zhao, Liang, "Dressed Human Modeling, Detection, and Parts Localization", A Dissertation Submitted in Partial Fulfillment of the Requirements for the Degree of Doctor of Philosophy at The Robotics Institute Carnegie Mellon University Pittsburgh, Jul. 26, 2001, 121 Pages.
Zhou, et al., "Data-Parallel Octrees for Surface Reconstruction", In IEEE Transactions on Visualization and Computer Graphics, vol. 17, Issue 5, May 27, 2011, 13 Pages.
Moreno, et al., "A Contextual Medical Image Viewer", In the Proceedings of IEEE Transactions of Information Technology in Biomedicine, vol. 11, No. 5, Sep. 2007, 10 Pages.
Mori, "Guiding Model Search Using Segmentation", In the Proceedings of the IEEE Workshop on Motion and Video Computing, IEEE Computer Society Washington, DC, USA., Feb. 23-24, 2007, 7 Pages.
Morra, et al., "Automatic Subcortical Segmentation Using a Contextual Model", In Proceedings of International Conference on Medical Image Computing and Computer-Assisted Intervention, Sep. 6, 2008, 8 Pages.
Narayanan, et al., "Ray Casting Deformable Models on the GPU", In Sixth Indian Conference on Computer Vision, Graphics & Image Processing., Dec. 16, 2008, 9 Pages.

Navaratnam, et al., "Hierarchical Part-Based Human Body Pose Estimation", In Proceedings of British Machine Vision Association (BMVC), Sep. 5, 2005, 10 Pages.
Neumann, et al., "Interactive Volume Rendering on a Multi-Computer", In Proceedings of the 1992 symposium on Interactive 3D Graphics, Jun. 1, 1992, 8 Pages.
Newcombe, et al., "DTAM: Dense Tracking and Mapping in Real-Time", In Proceedings of IEEE International Conference on Computer Vision, Nov. 6, 2011, 8 Pages.
Newcombe, et al., "Live Dense Re-Construction with a Single Moving Camera", In Proceedings of the IEEE Conference on Computer Vision and Pattern Recognition (CVPR)., Jun. 13, 2010, 8 Pages.
Newcombe, et al., "Mobile Camers Localization using Depth Maps.", Retrieved from: https://patents.google.com/patent/US8711206B2/en, Apr. 29, 2014, 25 Pages.
Newcombe, et al., "Moving Object Segmentation Using Depth Images.", Retrieved from: https://patents.google.com/patent/US8401225B2/en, Mar. 19, 2013, 32 Pages.
Newcombe, et al., "Real-Time Camera Tracking using Depth Maps", Retrieved from: https://patents.google.com/patent/US8401242B2/en, Mar. 19, 2013, 33 Pages.
Newcombe, et al., "Three Dimensional Envrionment Reconstruction", Retrieved from: https://patents.google.com/patent/US8587583B2/en, Nov. 19, 2013, 34 Pages.
Ni, et al., "Epitomic Location Recognition", In Proceeding of IEEE Conference on Computer Vision and Pattern Recognition, Jun. 23, 2008, 8 Pages.
Nister, David, "Preemptive RANSAC for Live Structure and Motion Estimation", In Proceedings of the Ninth IEEE International Conference on Computer Vision, Oct. 13, 2003, 8 Pages.
Nister, et al., "Scalable Recognition with a Vocabulary Tree", In Proceedings of the IEEE Computer Society Conference on Computer Vision and Pattern Recognition, Jun. 17, 2006, 8 Pages.
"Office Action Issued in Argentina Patent Application No. P120100292", dated Dec. 26, 2016, 4 Pages.
Parker, et al., "Interactive ray tracing for isosurface rendering", In the IEEE Proceedings of Visualization, Oct. 24, 1998, pp. 233-238.
Pascal, et al., "Vision Based 3D Tracking and Pose Estimation for Mixed Reality", In Emerging Technologies of Augmented Reality: Interfaces and Design, 2007, 20 Pages.
Pavlovic, et al., "Visual Interpretation of Hand Gestures for Human-Computer Interaction: A Review", In Proceedings of the IEEE Transactions on Pattern Analysis and Machine Intelligence vol. 19, No. 7, Jul. 1, 1997, 19 Pages.
"International Search Report and Written Opinion Issued in PCT Application No. PCT/US12/20681", dated Aug. 28, 2012, 8 Pages.
"International Search Report and Written Opinion Issued in PCT Application No. PCT/US12/20686", dated Aug. 22, 2012, 9 Pages.
"International Search Report and Written Opinion Issued in PCT Application No. PCT/US12/20687", dated Aug. 30, 2012, 8 Pages.
"International Search Report and Written Opinion Issued in PCT Application No. PCT/US12/62875", dated Mar. 25, 2013, 16 Pages.
Salama, et al., "Interactive Volume Rendering on Standard PC Graphics Hardware Using Multi-Textures and Multi-Stage Rasterization", In the Proceedings of the ACM SIGGRAPH/EUROGRAPHICS Workshop on Graphics Hardware, Interlaken, Switzerland., Aug. 21-22, 2000, pp. 109-118.
"International Preliminary Report on Patentability Issued in PCT Application No. PCT/US2014/012226", dated Jul. 9, 2015, 6 Pages.
"International Search Report & Written Opinion Issued in PCT Application No. PCT/US2014/012226", dated May 12, 2014, 8 Pages.
"Second Written Opinion Issued in PCT Application No. PCT/US2014/012226", dated Apr. 7, 2015, 5 Pages.
"International Preliminary Report on Patentability Issued in PCT Application No. PCT/US2014/016749", dated Jun. 5, 2015, 13 Pages.
"Second Written Opinion Issued in PCT Application No. PCT/US2014/016749", dated Aug. 21, 2014, 6 Pages.
Perdoch, et al., "Efficient Representation of Local Geometry for Large Scale Object Retrieval", In IEEE Conference on Computer Vision and Pattern Recognition, Jun. 20, 2009, 8 Pages.

(56) References Cited

OTHER PUBLICATIONS

Persson, et al., "Volume Rendering of Three-Dimensional Drip Infusion CT Cholangiography in Patients with Suspected Obstructive Biliary Disease: a Retrospective Study", In The British Journal of Radiology, 78.936., Dec. 2005, 21 Pages.
Pescia, et al., "Automatic Detection of Liver Tumors", In 5th IEEE International Symposium on Biomedical Imaging, May 14, 2008, 5 Pages.
Philbin, et al., "Object Retrieval with Large Vocabularies and Fast Spatial Matching", In IEEE Conference on Computer Vision and Pattern Recognition, Jun. 17, 2007, 8 Pages.
Philibin, et al., "Lost in Quantization: Improving Particular Object Retrieval in Large Scale Image Databases", Retrieved from: http://www.robots.ox.ac.uk:5000/~vgg/publications/2008/Philbin08/philbin08.pdf, 2008, 8 Pages.
Pohl, et al., "A Hierarchical Algorithm for MR Brain Image Parcellation", Retrieved from :https://www.ncbi.nlm.nih.gov/omc/articles/PMC2768067/, Sep. 26, 2007, 22 Pages.
Poppe, et al., "Body-part templates for recovery of 2D human poses under occlusion", In the Proceedings of International Conference on Articulated Motion and Deformable Objects, Springer, Berlin, Heidelberg., Jul. 9, 2008, 10 Pages.
Prasad, et al., "Multi-level Classification of Emphysema in HRCT Lung Images Using Delegated Classifiers", In Proceedings of the 11th International Conference on Medical Image Computing and Computer-Assisted Intervention (MICCAI), New York, NY, Sep. 6, 2008, 9 Pages.
Rublee, et al., "ORB: An Efficient Alternative to SIFT or SURF", In Proceeding of IEEE International Conference on Computer Vision, Nov. 6, 2011, 8 Pages.
Qian, et al., "A Gesture-Driven Multimodal Interactive Dance System", In Proceedings of the IEEE International Conference on Multimedia and Expo, vol. 3, Jun. 27, 2004, pp. 1579-1582.
Sato, et al., "Tissue Classification Based on 3D Local Intensity Structures for Volume Rendering", In Journal IEEE Transactions on Visualization and Computer Graphics archive vol. 6 Issue 2., Apr. 6, 2000, p. 160-180.
Raca, Mirko, "Improving 3D Human Pose Estimation", Retrieved from : https://wiki.epfl.ch/edicpublic/documents/Candidacy%20exam/candidacy_edic_raca.pdf, Jul. 4, 2011, 8 Pages.
Rautek, "Semantic Layers for Illustrative Volume Rendering", In the proceedings of IEEE Transactions on Visualization and Computer Graphics, vol. 13(6)., Nov. 2007, 8 Pages.
Robler, et al., "Dynamic Shader Generation for Flexible Multi-Volume Visualization", IEEE, Pacific Visualization Symposium (PacificVis), Mar. 5, 2008, 8 Pages.
Robler, et al., "GPU-based Multi-Volume Rendering for the Visualization of Functional Brain Images", In SimVis, Jan. 2006, 14 Pages.
Rosten, et al., "Faster and Better: A Machine Learning Approach to Corner Detection", In IEEE Transactions on Pattern Analysis and Machine Intelligence, vol. 32, Issue 1, Jan. 2010, 15 Pages.
Roth, et al., "Fields of Experts: A Framework for Learning Image Priors", In Proceedings of IEEE Computer Society Conference on Computer Vision and Pattern Recognition, Jun. 20, 2005, 8 Pages.
Rubin, et al., "Medical Imaging on the Semantic Web: Annotation and Image Markup.", In AAAI Spring Symposium: Semantic Scientific Knowledge Integration, Mar. 26, 2008, 6 Pages.
"A Framework for Intelligent Visualization of Multiple Time-Oriented Medical Records", In the Proceedings of Annual Symposium Proceedings, AMIA, vol. 2005., 2005, 9 Pages.
"Data Explosion: The Challenge of Multidetector-Row CT", In European Journal of Radiology, vol. 36, Issue 2., Nov. 2000, pp. 74-80.
"fovia.com". Retrieved from: https://www.fovia.com/, 2005, 3 Pages.
"From Structure-from-Motion Point Clouds to Fast Location Recognition", In Proceeding of IEEE Conference on Computer Vision and Pattern Recognition, Jun. 20, 2009, 8 Pages.
"Kabsch algorithm", Retrieved from:en.wikipedia.org/wiki/kabsch_algorithm, May 16, 2013 (Retrieved Date), 3 Pages.

"MapReduce", Retrieved from : http://web.archive.org/web/20120111070052/http://en.wikipedia.org/wiki/MapReduce, Jan. 11, 2012 (Retrirved Date), 5 Pages.
"Signed distance function", Retrieved from : http://web.archive.org/web/20120120095205/http://en.wikipedia.org/wiki/Signed_distance_function, Jan. 20, 2012 (Retrieved Date), 1 Page.
"ThevisualMD", Retrieved from: http://www.thevisualmd.com/, retrieved on Jan. 15, 2010, 1 Page.
"Non Final Office Action Issued in U.S. Appl. No. 13/092,786", dated May 24, 2013, 17 Pages.
"Volume Rendering on Server GPUs for Enterprise-Scale Medical Applications", In Proceedings of IEEE-VGTC Symposium on Visualization 2010, vol. 29 (2010), No. 3., 2010, 10 Pages.
"Office Action Issued in Taiwan Patent Application No. 101101731", dated Apr. 24, 2012, 15 Pages.
"Office Action in Korean Patent Application No. 10-2013-7019975", dated Feb. 12, 2018, 4 Pages.
"Office Action issued in Korean Patent Application No. 10-2013-7020295", dated Aug. 4, 2017, 12 Pages.
"Final Office Action Issued in U.S. Appl. No. 12/454,628", dated Oct. 5, 2012, 9 Pages.
"Non Final Office Action Issued in U.S. Appl. No. 12/454,628", dated May 4, 2012, 9 Pages.
"Final Office Action Issued in U.S. Appl. No. 12/697,785", dated Mar. 29, 2013, 13 Pages.
"Final Office Action Issued in U.S. Appl. No. 12/697,785", dated Aug. 20, 2014, 14 Pages.
"Non-Final Office Action Issued in U.S. Appl. No. 12/697,785", dated Mar. 25, 2014, 14 Pages.
"Non-Final Office Action Issued in U.S. Appl. No. 12/697,785", dated Sep. 13, 2012, 12 Pages.
"Final Office Action Issued in U.S. Appl. No. 12/725,811", dated Apr. 30, 2015, 20 Pages.
"Final Office Action Issued in U.S. Appl. No. 12/725,811", dated Sep. 11, 2013, 18 Pages.
"Non-Final Office Action Issued in U.S. Appl. No. 12/725,811", dated Feb. 25, 2013, 17 Pages.
"Non-Final Office Action Issued in U.S. Appl. No. 12/725,811", dated Jul. 15, 2014, 20 Pages.
"Final Office Action Issued in U.S. Appl. No. 12/979,362", dated Aug. 29, 2013, 12 Pages.
"Final Office Action Issued in U.S. Appl. No. 12/979,362", dated Sep. 25, 2014, 12 Pages.
"Non-Final Office Action Issued in U.S. Appl. No. 12/979,362", dated Mar. 14, 2014, 11 Pages.
"Non-Final Office Action Issued in U.S. Appl. No. 12/979,362", dated Apr. 9, 2015, 13 Pages.
"Non-Final Office Action Issued in U.S. Appl. No. 12/979,362", dated Mar. 19, 2013, 12 Pages.
"Office Action Issued in European Patent Application No. 12190592.1", dated Apr. 10, 2013, 5 Pages.
"Search Report Issued in European Patent Application No. 12190592.1", dated Mar. 28, 2013, 3 Pages.
"Office Action Issued in European Patent Application No. 12191941.9", dated Jan. 3, 2018, 9 Pages.
"Search Report Issued in European Patent Application No. 12191941.9", dated Dec. 7, 2017, 9 Pages.
"Search Report Issued in European Patent Application No. 12191941.9", dated Aug. 1, 2017, 15 Pages.
"Extended European Search Report Issued in European Patent Application No. 12741545.3", dated Jun. 27, 2014, 3 Pages.
"Office Action Issued in European Patent Application No. 12741545.3", dated Jul. 14, 2014, 4 Pages.
"Office Action Issued in European Patent Application No. 12741545.3", dated Feb. 9, 2018, 4 Pages.
"European Search Report issued in European Patent Application No. 12741552.9", dated Jan. 3, 2017, 4 Pages.
"Office Action Issued in European Patent Application No. 12741552.9", dated Mar. 17, 2017, 7 Pages.
"Office Action Issued in European Patent Application No. 12741552.9", dated Apr. 26, 2018, 5 Pages.
"Office Action Issued in European Patent Application No. 12742358.0", dated Feb. 2, 2017, 7 Pages.

(56) References Cited

OTHER PUBLICATIONS

"Search Report Issued in European Patent Application No. 12742358. 0", dated Jan. 9, 2017, 4 Pages.
"Final Office Action Issued in U.S. Appl. No. 13/017,474", dated Aug. 1, 2013, 15 Pages.
"Non-Final Office Action Issued in U.S. Appl. No. 13/017,474", dated Feb. 5, 2013, 14 Pages.
Final Office Action Issued in U.S. Appl. No. 13/017,518, dated May 20, 2014, 14 Pages.
"Non-Final Office Action Issued in U.S. Appl. No. 13/017,518", dated Sep. 25, 2013, 11 Pages.
"Non-Final Office Action Issued in U.S. Appl. No. 13/017,518", dated Mar. 5, 2015, 19 Pages.
"Non-Final Office Action Issued in U.S. Appl. No. 13/017,729", dated Jan. 18, 2013, 18 Pages.
"Final Office Action Issued in U.S. Appl. No. 13/092,786", dated Sep. 10, 2013, 18 Pages.
"Non Final Office Action Issued in U.S. Appl. No. 13/092,786", dated Dec. 30, 2013, 17 Pages.
"Final Office Action Issued in U.S. Appl. No. 15/895,990", dated Feb. 6, 2019, 17 Pages.
Westermann, "Efficiently Using Graphics Hardware in Volume Rendering Applications", In the Proceedings of the 25th Annual Conference on Computer Graphics and Interactive Techniques, ACM New York, NY, USA., Jul. 24, 1998, 9 Pages.
Whelan, et al., "Robust Tracking for Real-Time Dense RGB-D Mapping with Kintinuous", In technical report of MIT., Sep. 2012, 10 Pages.
Williams, et al., "Automatic Relocalization and Loop Closing for Real-Time Monocular SLAM", In IEEE Transactions on Pattern Analysis and Machine Intelligence, vol. 33, Issue 9, Sep. 2011, 14 Pages.
Williams, et al., "Real-Time SLAM Relocalisation", In Proceedings of International Conference on Computer Vision (ICCV), Rio de Janeiro, Brazil, Oct. 2007, 8 Pages.
Wilson, et al., "Combining Multiple Depth Cameras and Projectors for Interactions On, Above, and Between Surfaces", In Proceedings of the 23rd Annual ACM Symposium on User Interface Software and Technology, Oct. 3, 2010, 10 Pages.
Winder, et al., "Learning Local Image Descriptors", In Proceedings of the IEEE Conference on Computer Vision and Pattern Recognition, Jul. 17, 2007, 8 Pages.
Wu, et al., "3D Model Matching with Viewpoint-Invariant Patches (VIP)", In Proceedings of the IEEE Conference on Computer Vision and Pattern Recognition, Jun. 23, 2008, 8 Pages.
Wu, et al., "Bundling Features for Large Scale Partial-Duplicate Web Image Search", Retrieved From: http://vc.cs.nthu.edu.tw/home/paper/codfiles/chyu/200906300559/Bunlded_CVPR2009.pdf, 2009, 8 Pages.
Wuhrer, et al., "Human Shape Correspondence with Automatically Predicted Landmarks", In Journal of Machine Vision and Applications, vol. 22, Aug. 6, 2011, 9 Pages.
Xia, et al., "Human Detection Using Depth Information by Kinect", In Proceeding of IEEE Computer Vision and Pattern Recognition, Published on: Jun. 21, 2011, 8 Pages.
Yagel, "Volume Viewing Algorithms: Survey", In International Spring School on Visualization., 2000, 22 Pages.
Yan, et al., "Robustly Aligning a Shape Model and Its Application to Car Alignment of Unknown Pose", In IEEE Transactions on Pattern Analysis and Machine Intelligence, IEEE Computer Society, USA, vol. 33, No. 9., Sep. 1, 2011, pp. 1860-1876.
"Oral Hearing Issued in European Patent Application No. 14704433. 3", Mailed Date: Aug. 10, 2016, 5 Pages.
Yi, et al., "Discriminative, Semantic Segmentation of Brain Tissue in MR Images", In International Conference on Medical Image Computing and Computer-Assisted Intervention, Springer, Berlin, Heidelberg., Sep. 20, 2009, 8 Pages.
Yin, et al., "Tree-based Classifiers for Bilayer Video Segmentation", In the Proceedings of IEEE Conference on Computer Vision and Pattern Recognition, Jun. 17, 2007, 8 Pages.

Yu, et al., "Monocular Video Foreground/Background Segmentation by Tracking Spatial-Color Gaussian Mixture Models", In Proceedings of Workshop on Motion and Video Computing, Feb. 2007, 8 Pages.
Zambal, et al., "Entropy-Optimized Texture Models", In Proceedings of the 11th International Conference on Medical Image Computing and Computer-Assisted Intervention, New York., Sep. 6, 2008, 9 Pages.
Zhan, et al., "Active Scheduling of Organ Detection and Segmentation in Whole-Body Medical Images", In Proceedings of International Conference on Medical Image Computing and Computer-Assisted Intervention, Springer, Berlin, Heidelberg., Sep. 6, 2008, pp. 313-321.
Zhang, et al., "Descriptive visual words and visual phrases for image applications", In Proceedings of the 17th ACM international conference on Multimedia, Oct. 23, 2009, pp. 75-84.
Zhang, et al., "Efficient Indexing for Large Scale Visual Search", In IEEE 12th International Conference on Computer Vision 2009, Sep. 29, 2009, 8 Pages.
Zhong, Yuan, "A Weighting Scheme for Content-Based Image Retrieval", Retrieved from: http://www.library.uow.edu.au/adt-NWU/uploads/approved/adt-NWU20080116.091123/public/01Front.pdf, 11 Pages.
Zhou, et al., "Highly Parallel Surface Reconstruction", In Microsoft Research, Technical Report MSR-TR-2008-53, Apr. 2008, 10 Pages.
Zhuang, et al., "An Atlas-based Segmentation Propagation Framework Using Locally Affine Registration", In Proceedings of International Conference on Medical Image Computing and Computer-Assisted Intervention, Sep. 6, 2008, pp. 425-433.
Ziegler, et al., "Tracking of the Articulated Upper Body On Multi-View Stereo Image Sequences", In IEEE Computer Society Conference on Computer Vision and Pattern Recognition, vol. 1,, Jun. 17, 2006, pp. 774-781.
Zillner, et al., "Semantics and CBIR: A Medical Imaging Perspective", In Proceedings of the 2008 international conference on Content-based image and video retrieval, 2008., Jul. 7, 2008, 10 Pages.
Wagner, et al. "Multiple target detection and tracking with guaranteed framerates on mobile phones", In Proceedings of the 8th IEEE International Symposium on Mixed and Augmented Reality, Oct. 2009, 8 Pages.
"Non Final Office Action Issued in U.S. Appl. No. 15/895,990", dated Jun. 10, 2019, 16 Pages.
"Toward Unsupervised 3D Reconstruction from Unorganized Multi-view Images", In Thesis Submitted in Partial Fulfillment of the Requirements for the Degree of Doctor of Philosophy in Engineering, Aug. 2007, 16 Pages.
"Notice on Reexamination Issued in Chinese Patent Application No. 201380068406.7", dated Sep. 2, 2019, 7 Pages.
Dam, et al., "Immersive VR for Scientific Visualization: A Progress Report", In Journal IEEE Computer Graphics and Applications, vol. 20 Issue 6, Nov. 1, 2000,27 Pages.
Daniele, Ravi, "Kinect: The Next Generation of Motion Control", Retrieved from:http://www.dmi.unict.it/-battiato/CVision1112/Kinect.pdf, Feb. 9, 2013,66 Pages.
Angel, et al."Intuitive Volume Classification in Medical Augmented Reality (AR)", Current Topics in Computer and Robot Assisted Surgery (CURAC), German Medical Science., Sep. 20, 2006,9 Pages.
Ding, et al."Extraction of Human Body Skeleton Based on Silhouette Images", In Second International Workshop on Education Technology and Computer Science, vol. 1, Mar. 6, 2010,pp. 71-74.
Dolejsi, et al."Reducing False Positive Responses in Lung Nodule Detector System by Asymmetric Ada boost", In IEEE International Symposium on Biomedical Imaging From Nano to Macro (ISBI), May 14, 2008,4 Pages.
Dong, et al."Keyframe-Based Real-Time Camera Tracking", In IEEE 12th International Conference on Computer Vision, Sep. 29, 2009,8 Pages.
Eade, et al."Unified Loop Closing and Recovery for Real Time Monocular SLAM", In Proceeding of 19th British Conference on Machine Vision, Sep. 1, 2008,10 Pages.

(56) References Cited

OTHER PUBLICATIONS

Efros, et al." Image Quilting for Texture Synthesis and Transfer", In Proceedings of the 28th Annual Conference on Computer Graphics and Interactive Techniques, Aug. 1, 2001,6 Pages.

Elgammal"Inferring 3D Body Pose from Silhouettes using Activity Manifold Learning", In Proceedings of IEEE Computer Society Conference on Computer Vision and Pattern Recognition, vol. 2, Jun. 27, 2004,8 Pages.

Engel, et al."A Framework for Interactive Hardware Accelerated Remote 3D-Visualization", In Data Visualization 2000., May 2000,pp. 167-177.

Engel, et al."Combining Local and Remote Visualization Techniques for Interactive Volume Rendering in Medical Applications", In the Proceedings of the Conference on Visualization'00. IEEE Computer Society Press., Oct. 1, 2000,5 Pages.

Engel, et al."High-Quality Pre-integrated Volume Rendering Using Hardware-Accelerated Pixel Shading", In Proceedings of the ACM SIGGRAPH/EUROGRAPHICS Workshop on Graphics Hardware., Aug. 2001,9 Pages.

Engel, et al."Real-Time Volume Graphics", In Book Real-Time Volume Graphics, Jul. 21, 2006,19 Pages.

Escalera, et al."Automatic Chessboard Detection for Intrinsic and Extrinsic Camera Parameter Calibration", In Sensors, vol. 10, Issue 3,, Mar. 2010,18 Pages.

Fanelli, et al."Real Time Head Pose Estimation with Random Regression Forests", In IEEE Conference on Computer Vision and Pattern Recognition, Jun. 20, 2011,8 Pages.

Fenchel"Automatic Labeling of Anatomical Structures in MR FastView Images Using a Statistical Atlas", In Proceedings of the 11th International Conference on Medical Image Computing and Computer-Assisted Intervention (MICCAI), New York, NY., Sep. 6, 2008,9 Pages.

Fergus, et al."Object Class Recognition by Unsupervised Scale-Invariant Learning", In Proceedings of the IEEE Conference on Computer Vision and Pattern Recognition, vol. 2., Jun. 18, 2003,8 Pages.

Fitzgibbon, Andrew, et al."Image-Based Rendering Using Image-Based Priors", In Proceedings of Ninth IEEE International Conference on Computer Vision vol. 63 Issue—2., Oct. 14, 2003,11 Pages.

Fitzgibbon, "Robust Registration of 2D and 3D Point Sets", In Proceedings of Image and Vision Computing, 2003, Dec. 1, 2003,10 Pages.

Forahobby,"How You Become the Controller with Xbox 360 Kinect", Retrieved from: https://web.archive.org/web/20170614002544/http://www.360-hq.com/article4096.html, Jan. 11, 2011.

Freeman, et al."Learning Low-Level Vision", In International Journal of Computer Vision, vol. 40(1)., Oct. 1, 2000,45 Pages.

Freiman, et al."Classification of Suspected Liver Metastases Using fMRI Images: A Machine Learning Approach", In International Conference on Medical Image Computing and Computer-Assisted Intervention., Sep. 6, 2008,94 Pages.

Freund, et al."An Efficient Boosting Algorithm for Combining Preferences", In Journal of Machine Learning Research, Nov. 4, 2003,37 Pages.

Fujii, et al."Three-dimensional finger tracking using direct and reflected infrared images", In Proceeedings of ACM User Interface Software and Technology, Oct. 2002,2 Pages.

Gall, et al."Hough Forests for Object Detection, Tracking, and Action Recognition", In IEEE Transactions on Pattern Analysis and Machine Intelligence, vol. 33, Issue 11, Nov. 2011,15 Pages.

Garstka, et al."View-dependent 3D Projection using Depth-Image-based Head Tracking", In Proceedings of IEEE International Workshop on Projector-Camera Systems, Jun. 24, 2011,7 Pages.

Gee, et al."6D Relocalisation for RGBD Cameras Using Synthetic View Regression", In Proceeding of British Machine Vision Conference, Sep. 3, 2012,11 Pages.

Gemme, et al."Pose Refinement Using ICP Applied to 3-D LIDAR Data for Exploration Rovers", In Proceedings of International Symposium on Artificial Intelligence, Robotics and Automation in Space, Sep. 4, 2012,8 Pages.

Ginneken"Robust Segmentation and Anatomical Labeling of the Airway Tree from Thoracic CT Scans", In International Conference on Medical Image Computing and Computer-Assisted Intervention, Sep. 6, 2008,pp. 219-226.

Goesele, et al."Multiview Stereo Revisited", In Proceedings of the IEEE Conference on Computer Vision and Pattern Recognition (CVPR), 2006, 8 Pages.

Grauman, et al."The Pyramid Match Kernel Discriminative Classification with Sets of Image Features", In Tenth IEEE International Conference on Computer Vision, vol. 2, Oct. 17, 2005,12 Pages.

Gudivada, et al., "A Geometry-Based Representation for Efficient and Effective Retrieval of Images by Spatial Similarity", In IEEE Transactions on Knowledge and Data Engineering, vol. 10, Issue 3, Jun. 1998, 1 Page.

Guthe, et al."Interactive Rendering of Large Volume Data Sets", In the Proceedings of the Conference on Visualization, Oct. 27, 2002, pp. 53-60.

Hadwiger, et al."GPU-Based Volume Ray-Casting with Advanced Illumination", In Proceedings of ACM SIGGRAPH 2009 Courses, Article No. 2 , New Orleans, Louisiana., Aug. 3-7, 2009,173 Pages.

Han, et al."Atlas-Based Auto-Segmentation of Head and Neck CT Images", In Proceedings of the 11th International Conference on Medical Image Computing and Computer-Assisted Intervention (MICCAI), New York, NY., Sep. 6, 2008,8 Pages.

Haqiqat"Using Image Moments for Tracking Rotating Objects", In ICGST International Conference on Automation, Robotics and Autonomous Systems, Dec. 19, 2005.

Hardenbergh, et al."Integrated 3D Visualization of fMRI and DTI Tractography", In Proceedings of IEEE Visualization, Oct. 2005,2 Pages.

Hastreiter, et al."Interactive Direct Volume Rendering of the Inner Ear for the Planning of Neurosurgery", In Bildverarbeitung für die Medizin, Springer, Berlin, Heidelberg, 1999,pp. 192-196.

Herath, et al."Simultaneous Localisation and Mapping: A Stereo Vision Based Approach", In International Conference on Intelligent Robots and Systems, Oct. 2006,,6 Pages.

Hersh, et al."Medical Image Retrieval and Automatic Annotation: OHSU at ImageCLEF 2007", In Workshop of the Cross-Language Evaluation Forum for European Languages, 2007, Sep. 19, 2007,8 Pages.

Hile, et al."Information Overlay for Camera Phones in Indoor Environments", In Proceedings of the 3rd International Conference on Location-and Context-Awareness, Sep. 20, 2007,17 Pages.

Hirsch, et al."BiOi Screen: A Thin, Depth-Sensing LCD for 30 Interaction using Light Fields", In ACM Transactions on Graphics, Proceedings of ACM SIGGRAPH Asia, vol. 28, Issue 5, Dec. 2009,9 Pages.

Hogue, et al."Underwater Environment Reconstruction using Stereo and Inertial Data", In IEEE International Conference on Systems, Man and Cybernetics, Jan. 2008,6 Pages.

Holzer, et al."Learning to Efficiently Detect Repeatable Interest Points in Depth Data", In Proceedings of the 12th European Conference on Computer Vision, vol. Part I, Oct. 7, 2012,14 Pages.

Homann, et al."Vasculature Segmentation of CT Liver Images Using Graph-cuts and Graph-based Analysis", In Proceedings of IEEE International Symposium on Biomedical Imaging From Nano to Macro (ISBI)., May 14, 2008,4 Pages.

Huang, et al."Estimating Human Pose from Occluded Images", In Asian Conference on Computer Vision , Springer, Berlin, Heidelberg., Sep. 23, 2009,12 Pages.

Humphreys, et al."Chromium: A Stream Processing Framework for Interactive Rendering on Clusters", In the Proceedings of the 29th Annual Conference on Computer Graphics and Interactive Techniques, San Antonio, Texas., Jul. 23-26, 2002,pp. 693-702.

Izadi, et al."Reducing Interference Between Multiple Infra-Red Depth Cameras", Retrieved from; https://patents.google.com/patent/US9247238B2/en, Jan. 26, 2016.

Izadi"Using a Three Dimensional Environment Model in GamePlay", Retrieved from: https://patents.google.com/patent/US8570320B2/en, Oct. 29, 2013,31 Pages.

Jakobovits, et al."WIRM: An Open Source Toolkit for Building Biomedical Web Applications", In Journal of the American Medical Informatics Association, vol. 9, Issue 6., Nov. 2002,14 Pages.

(56) References Cited

OTHER PUBLICATIONS

"Office Action Issued in European Patent Application No. 12742358.0", dated Oct. 2, 2019, 6 Pages.
Fransen et al. "Real-Time Face and Object Tracking", In Proceedings of the IEEE/RSJ International Conference on Intelligent Robots and Systems, Oct. 11, 2009, pp. 2483-2488.
"Final Office Action Issued in U.S. Appl. No. 13/154,288", dated Jun. 10, 2014, 22 Pages.
"Non-Final Office Action Issued in U.S. Appl. No. 13/154,288", dated Oct. 24, 2013, 18 Pages.
"Non Final Office Action Issued in U.S. Appl. No. 13/300,542", dated Sep. 4, 2013, 10 Pages.
"Non Final Office Action Issued in U.S. Appl. No. 13/729,324", dated May 10, 2016, 16 Pages.
"Final Office Action Issued in U.S. Appl. No. 13/749,497", dated Nov. 10, 2014, 14 Pages.
"Non Final Office Action Issued in U.S. Appl. No. 13/749,497", dated Jun. 10, 2014, 15 Pages.
"Non Final Office Action Issued in U.S. Appl. No. 13/749,497", dated Mar. 5, 2015, 14 Pages.
"Final Office Action Issued in U.S. Appl. No. 13/774,145", dated May 3, 2016, 18 Pages.
"Final Office Action Issued in U.S. Appl. No. 13/774,145", dated Mar. 20, 2015, 16 Pages.
"Final Office Action Issued in U.S. Appl. No. 13/774,145", dated Dec. 15, 2016, 18 Pages.
"Non Final Office Action Issued in U.S. Appl. No. 13/774,145", dated May 19, 2017, 20 Pages.
"Non-Final Office Action Issued in U.S. Appl. No. 13/774,145", dated Nov. 6, 2014, 12 Pages.
"Non-Final Office Action Issued in U.S. Appl. No. 13/774,145", dated Oct. 2, 2015, 15 Pages.
"Non-Final Office Action Issued in U.S. Appl. No. 13/774,145", dated Aug. 24, 2016, 16 Pages.
"Non Final Office Action Issued in U.S. Appl. No. 13/902,506", dated Mar. 13, 2015, 6 Pages.
"Non-Final Office Action Issued in U.S. Appl. No. 14/978,123", dated Jan. 24, 2018, 10 Pages.
"Non-Final Office Action Issued in U.S. Appl. No. 14/978,123", dated Jul. 6, 2017, 7 Pages.
"Office Action Issued in European Patent Application No. 14704433.3", dated May 31, 2016, 4 Pages.
"Office Action Issued in European Patent Application No. 14709030.2", dated Feb. 24, 2017, 6 Pages.
"Office Action Issued in European Patent Application No. 14709030.2", dated Sep. 29, 2017, 5 Pages.
"Non-Final Office Action Issued in U.S. Appl. No. 15/001,645", dated Oct. 19, 2017, 6 Pages.
"Non Final Office Action Issued in U.S. Appl. No. 15/895,990", dated Sep. 20, 2018, 14 Pages.
"First Office Action Issued in Chinese Patent Application No. 201110118235.7", dated Dec. 4, 2012, 8 Pages.
"First Office Action and Search Report Issued in Chinese Patent Application No. 200980149038.2", dated Dec. 4, 2013, 10 Pages.
"First Office Action Issued in Chinese Patent Application No. 201210021228.X", dated Dec. 13, 2013, 16 Pages.
"Fourth Office Action issued in Chinese Patent Application No. 201210021228.X", dated Jun. 24, 2015, 7 Pages.
"Second Office action Issued in Chinese Patent Application No. 201210021228.X", dated Jul. 8, 2014, 14 Pages.
"Third Office Action Issued in Chinese Patent Application No. 201210021228.X", dated Dec. 12, 2014, 7 Pages.
"First Office Action and Search Report Issued in Chinese Patent Application No. 201210021241.5", dated Dec. 24, 2013, 17 Pages.
"Second Office Action Issued in Chinese Patent Application No. 201210021241.5", dated Aug. 7, 2014, 14 Pages.
"First Office Action Issued in Chinese Patent Application No. 201210021579.0", dated Jul. 2, 2014, 14 Pages.
"Office Action Issued in Chinese Patent Application No. 201210021582.2", dated Sep. 10, 2014, 7 Pages.
"Office Action Issued in Chinese Patent Application No. 201210021582.2", dated Jan. 3, 2014, 14 Pages.
"Third Office Action Issued in Chinese Patent Application No. 201210021582.2", dated Mar. 9, 2015, 7 Pages.
"Decision on Re-Examination Issued in Chinese Patent Application No. 201210021583.7", dated Sep. 5, 2017, 12 Pages.
"First Office Action Issued in Chinese Patent Application No. 201210021583.7", dated Jan. 20, 2014, 14 Pages.
"Fourth Office Action Issued in Chinese Patent Application No. 201210021583.7", dated Oct. 9, 2015, 3 Pages.
"Notice of Re-Examination issued in Chinese Patent Application No. 201210021583.7", dated Jan. 12, 2017, 7 Pages.
"Office Action Issued in Chinese Patent Application No. 201210021583.7", dated Apr. 20, 2016, 9 Pages.
"Second Office action Issued in Chinese Patent Application No. 201210021583.7", dated Sep. 19, 2014, 8 Pages.
"Third Office Action Issued in Chinese Patent Application No. 201210021583.7", dated Mar. 27, 2015, 8 Pages.
"First Office Action and Search Report Issued in Chinese Patent Application No. 201210431972.7", dated Dec. 1, 2014, 13 Pages.
"Second Office Action Issued in Chinese Patent Application No. 201210431972.7", dated Jul. 7, 2015, 7 Pages.
"Third Office Action Issued in Chinese Patent Application No. 201210431972.7", dated Nov. 26, 2015, 8 Pages.
"First Office Action Issued in Chinese Patent Application No. 201210470054.5", dated Dec. 17, 2014, 17 Pages.
"Second Office Action Issued in Chinese Patent Application No. 201210470054.5", dated Aug. 13, 2015, 6 Pages.
"Office Action Issued in Japanese Patent Application No. 2013-552530", dated Nov. 4, 2015, 5 Pages.
"Office Action Issued in Japanese Patent Application No. 2013-552531", dated Oct. 26, 2015, 6 Pages.
"Office Action Issued in Japanese Patent Application No. 2013-552532", dated Jan. 29, 2016, 6 Pages.
"First Office Action Issued in Chinese Patent Application No. 201480006047.7", dated Jan. 26, 2017, 14 Pages.
Jegou, et al."Packing Bag-of Features", In IEEE 12th International Conference on Computer Vision, Sep. 29, 2009,9 Pages.
Jin, et al."Active illumination based 3D surface reconstruction and registration for image-guided medialization laryngoplasty", In the Proceedings of Optical Diagnostics of Living Cells II, vol. 6509, Mar. 6, 2007,13 Pages.
Jivet, et al."Real Time Representation of 3D Sensor Depth Images", WSEAS Transactions on Electronics, vol. 5, Issue 3, Mar. 2008,,7 Pages.
Jojic, Nebojsa"Epitomic Analysis of Appearance and Shape", In Proceedings of the Ninth IEEE International Conference on Computer Vision, vol. 2, 2003,34 Pages.
Jung"A Framework of Context-Sensitive Visualization for User-Centered Interactive Systems", In the Proceedings of 10th International Conference on User Modelling, Edinburgh, UK., Jul. 24, 2005,5 Pages.
Kabsch, W."A Solution for the Best Rotation to Relate Two Sets of Vectors", Acta Crystallographica Section A: Crystal Physics, Diffraction, Theoretical and General Crystallography, vol. 32, Issue 5., Sep. 1976,pp. 922-923.
Kainz, et al."Ray Casting of Multiple Volumetric Datasets with Polyhedral Boundaries on Manycore GPUs", In the Proceeding ACM SIGGRAPH Asia 2009 papers Article No. 1, Yokohama, Japan., Dec. 16-19, 2009.
Kalra, et al."Topological Modeling Of Human Anatomy Using Medical Data", In Proceedings of the Computer Animation Conference, Geneva, Switzerland., Apr. 19, 1995,12 Pages.
Kanaujia, et al."Semi-supervised Hierarchical Models for 3D Human Pose Reconstruction", In Proceedings o IEEE Conference on Computer Vision and Pattern Recognition, 2007, Jun. 17, 2007,8 Pages.
Kazhdan, M."Poisson Surface Reconstruction", In Proceedings of the fourth Eurographics symposium on Geometry processing. 2006, Jun. 2006,10 Pages.
Kil, et al."GPU-assisted Surface Reconstruction on Locally-Uniform Samples", In Proceedings of the 17th International Meshing Roundtable, Oct. 12, 2008,18 Pages.

(56) References Cited

OTHER PUBLICATIONS

Kim, et al."Relocalization Using Virtual Keyframes For Online Environment Map Construction", In Proceedings of the 16th ACM Symposium on Virtual Reality Software and Technology,, Nov. 2009,,8 Pages.

Klein, et al."Improving the Agility of Keyframe-Based SLAM", In Proceedings of the 10th European Conference on Computer Vision, Oct. 12, 2008,14 Pages.

Kniss, et al."Multi-Dimensional Transfer Functions for Interactive Volume Rendering", In Journal IEEE Transactions on Visualization and Computer Graphics archive vol. 8 Issue 3., Jul. 2002,pp. 270-285.

Knoop, et al."Sensor Fusion for 3D Human Body Tracking with an Articulated 3D Body Model", In Proceedings of IEEE International Conference on Robotics and Automation (ICRA), May 19, 2006,7 Pages.

Krahnstoever, et al."Articulated Models from Video", In the Proceedings of the 2004 IEEE Computer Society Conference, vol. 1, pp. I-I, Jun. 2004,8 Pages.

Kruger, et al."Acceleration Techniques for GPU-based Volume Rendering", In the Proceeding VIS '03 Proceedings of the 14th IEEE Visualization 2003 (VIS'03), Oct. 22-24, 2003,6 Pages.

Kurihara"Modeling Deformable Human Hands from Medical Images", Proceedings of the 2004 ACM SIGGRAPH, 2004,9 Pages.

Kurkure, et al."Automated Segmentation of Thoracic Aorta in Non-Contrast CT Images", IEEE International Symposium on Biomedical, May 14, 2008,4 Pages.

Lacroute, et al."Fast Volume Rendering Using a Shear-Warp Factorization of the Viewing Transformation", In the Proceedings of the 21st Annual Conference on Computer Graphics and Interactive Techniques, Jul. 24, 1994,236 Pages.

Lacroute"Real-Time Volume Rendering on Shared Memory Multiprocessors Using the Shear-Warp Factorization", In the Proceedings of the IEEE Symposium on Parallel Rendering, Atlanta, Georgia, USA., Oct. 30-31, 1995,6 Pages.

Laxton, Benjamin"Monocular Human Pose Estimation", Retrieved From <<http://vision.ucsd.edu/~blaxton/pagePapers/laxton_researchExam2007.pdf>>, Jun. 26, 2009,16 Pages.

Lay, et al."Process Oriented Knowledge Management to Support Clinical Pathway Execution", In Wissens Management, Apr. 22, 2005.

Lazebnik, et al."Beyond Bags of Features: Spatial Pyramid Matching for Recognizing Natural Scene Categories", In Proceedings of the 2006 IEEE Computer Society Conference on Computer Vision and Pattern Recognition ,vol. 2., Jun. 17, 2006,9 Pages.

Lee, et al."Body Part Detection for Human Pose Estimation and Tracking", In Proceedings of the IEEE Workshop on Motion and Video Computing, Feb. 23, 2007,8 Pages.

Leibe, et al."Interleaved Object Categorization and Segmentation", In Proceedings of British Machine Vision Conference, 2003., 2003,5 Pages.

Leibe, et al."Robust Object Detection with Interleaved Categorization and Segmentation", In International Journal of Computer Vision , vol. 77 Issue 1-3., May 2008,31 Pages.

Lepetit, et al."Keypoint Recognition using Randomized Trees", In IEEE Transactions on Pattern Analysis and Machine Intelligence, vol. 28, Issue 9,, Sep. 2006,15 Pages.

Lepetit, et al."Randomized Trees for Real-Time Keypoint Recognition", In Proceedings of the IEEE Computer Society Conference on Computer Vision and Pattern Recognition (CVPR), vol. 2, Jun. 20, 2005,pp. 775-781.

Levoy, et al."Display of Surfaces from Volume Data", In Journal IEEE Computer Graphics and Applications Archive vol. 8 Issue 3., May 1988,18 Pages.

Levoy, et al. "Volume Rendering by Adaptive Refinement", In Journal The Visual Computer: International Journal of Computer Graphics archive vol. 6 Issue 1., 1990,5 Pages.

Li, et al."Empty Space Skipping and Occlusion Clipping for Texture-based Volume Rendering", In the Proceedings of the 14th IEEE Visualization 2003 (VIS'03), IEEE Computer Society Washington, DC, USA., Oct. 22-24, 2003,8 Pages.

Li, et al."Location Recognition using Prioritized Feature Matching", In Proceedings of the 11th European Conference on Computer Vision, Sep. 5, 2010,14 Pages.

Linguraru"Multi-organ Automatic Segmentation in 4D Contrast-Enhanced Abdominal CT", In IEEE International Symposium on Biomedical Imaging From Nano to Macro, May 14, 2008,4 Pages.

Liu, Ting, et al."An Investigation of Practical Approximate Nearest Neighbor Algorithms", Advances in neural information processing systems, 2004,8 Pages.

Liu, et al."Integrated Feature Selection and Higher-order Spatial Feature Extraction for Object Categorization", In IEEE Conference on Computer Vision and Pattern Recognition, Jun. 23-28, 2008,8 Pages.

Ljung, et al."Efficient Methods for Direct Volume Rendering of Large Data Sets", Doctoral Thiesis, Linköping University, Department of Science and Technology, Visual Information Technology and Applications (VITA). Linköping University, The Institute of Technology., 2006,90 Pages.

Lowe, David G.."Distinctive Image Features from Scale-Invariant Keypoints", In Proceedings of the International Journal of Computer Vision, vol. 60, Issue 2, Nov. 1, 2004,20 Pages.

Lu, et al."Multi-view human motion capture with an improved deformation skin model", Digital Image Computing: Techniques and Applications, 2008,8 Pages.

Lum, et al."Texture Hardware Assisted Rendering of Time-Varying Volume Data", In the Proceedings of the Conference on Visualization '01, IEEE Computer Society Washington, DC, USA., Oct. 21-26, 2001,10 Pages.

Lysenkov, et al."Recognition and Pose Estimation of Rigid Transparent Objects with a Kinect Sensor", In Robotics: Science and Systems 2012 ,Sydney, NSW, Australia., Jul. 13, 2012,8 Pages.

Ma, et al."A Data Distributed, Parallel Algorithm for Ray-Traced Volume Rendering", In the Proceedings of the 1993 Symposium on Parallel Rendering, San Jose, California, USA., Oct. 25-26, 1993,32 Pages.

Magnenat-Thalmann, et al."Joint-dependent local deformations for hand animation and object grasping", In Proceedings on Graphics interface , Canadian Information Processing Society, 1988,12 Pages.

Markelj, et al."A Review of 3D/2D Registration Methods for Image-Guided Interventions", Medical Image Analysis, Oxford University Press, Oxford, GB, vol. 16, No. 3., Apr. 1, 2012,pp. 642-661.

Marszalek, et al."Spatial Weighting for Bag-of-Features", In IEEE Computer Society Conference on Computer Vision and Pattern Recognition, vol. 2., 2006,9 Pages.

Michel, et al."GPU-Accelerated Real-time 3D Tracking for Humanoid Locomotion and Stair Climbing", Proceedings of the IEEE/RSJ International Conference on Intelligent Robots and Systems, Nov. 2007,,7 Pages.

Mikolajczyk, et al."Scale & Affine Invariant Interest Point Detectors", In International Journal of Computer Vision 60 (1 ), Kluwer Academic Publishers,Manufactured in The Netherlands., Oct. 2004,24 Pages.

Milella, et al."Stereo-Based Ego-Motion Estimation Using Pixel Tracking and Iterative Closest Point", In Proceedings of the Fourth IEEE International Conference on Computer Vision Systems, Jan. 4, 2006,7 Pages.

Molchanov, et al."Non-iterative Second-order Approximation of Signed Distance Functions for Any Isosurface Representation", In Eurographics/ IEEE-VGTC Symposium on Visualization, vol. 29, Issue 3, Nov. 2010,10 Pages.

Montillo, et al."Age Regression from Faces Using Random Forests", In Proceedings of the 16th IEEE International Conference on Image Processing, Nov. 7, 2009,4 Pages.

"First Office Action and Search Report Issued in Chinese Patent Application No. 201480010236.1", dated Jan. 19, 2018, 15 Pages.

"Second Office Action Issued in Chinese Patent Application No. 201480010236.1", dated Sep. 5, 2018, 6 Pages.

(56) References Cited

OTHER PUBLICATIONS

Agarwal, et al., "3D Human Pose from Silhouettes by Relevance Vector Regression", In Proceedings of IEEE Computer Society Conference on Computer Vision and Pattern Recognition, vol. 2, Jun. 27, 2004, 7 Pages.

Agarwal, et al., "Learning Methods for Recovering 3D Human Pose from Monocular Images", In Technical Report 5333, INRIA Rhone-Aipes, 2004, Oct. 2004, 22 Pages.

Alkemade, Remi, "Depth Perception for Augmented Reality using Parallel Mean Shift Segmentation", In Bachelor Thesis, Radboud University., Apr. 27, 2010, 47 Pages.

Amit, et al., "Shape Quantization and Recognition with Randomized Trees", In Journal of Neural Computation, vol. 9, Issue 7, Oct. 1, 1997, 56 Pages.

Andoni, et al., "Near-Optimal Hashing Algorithms for Approximate Nearest Neighbor in High Dimensions", In Magazine Communications of the ACM—50th anniversary issue: 1958-2008, vol. 51 Issue 1., Jan. 2008, pp. 117-122.

Baak, et al., "A Data-Driven Approach for Real-Time Full Body Pose Reconstruction from a Depth Camera", In Proceedings with IEEE International Conference on Computer Vision, 2011, Nov. 13, 2011, 8 Pages.

Baatz, et al., "Leveraging 3D City Models for Rotation Invariant Place-of-Interest Recognition", In International Journal of Computer Vision, vol. 96, Issue 3, May 27, 2011, 20 Pages.

Bacon, Pierre-Luc, "Continous Head Pose Estimation using Random Regression Forests", Retrieved From: http://pierrelucbacon.com/assets/papers/rrfpose.pdf, Feb. 9, 2013, 6 Pages.

Ballan, "Marker-less motion capture of skinned models in a four camera set-up using optical flow and silhouettes", 3DPVT, Atlanta, GA, USA, 2008, 8 Pages.

Baltzakis, et al., "Tracking of human hands and faces through probabilistic fusion of multiple visual cues", In Proceedings of 6th International Conference on Computer Vision Systems(ICVS), May 12, 2008, 10 Pages.

Benko, et al., "Depth Touch: Using Depth-Sensing Camera to Enable Freehand Interactions On and Above the Interactive Surface", In Proceedings of IEEE Tabletops and Interactive Surfaces, Oct. 1, 2008, 1 page.

Beyer, "GPU-based Multi-Volume Rendering of Complex Data in Neuroscience and Neurosurgery", Doctoral Dissertation ,Vienna University of Technology., Oct. 2009, pp. 1-117.

Dalal, et al., "Histograms of oriented gradients for human detection", In Proceedings of IEEE Computer Society Conference on Computer Vision and Pattern Recognition, Jun. 20, 2005, 8 Pages.

Boehnke, Kay, "Fast Object Localization with Real Time 3D Laser Range Sensor Simulation", In Book World Scientific and Engineering Academy and Society (WSEAS) Transactions On Electronics, Issue 3, vol. 5, Mar. 2008, 10 Pages.

Bolitho, et al., "Parallel Poisson Surface Reconstruction", In Proceeding of the 5th International Symposium on Advances in Visual Computing (ISVC): Part I, Nov. 26, 2009, 12 Pages.

Bolitho, Matthew Grant., "The Reconstruction of Large Three-dimensional Meshes", In Dissertation Submitted To The Johns Hopkins University In Conformity With The Requirements For The Degree Of Doctor Of Philosophy, Mar. 2010, 171 Pages.

Borenstein, et al., "Class-specific, top-down segmentation", In Proceedings of European Conference on Computer Vision, 2003., May 28, 2002, 15 Pages.

Borenstein, et al., "Combining Top-Down and Bottom-up Segmentation", In Proceedings IEEE workshop on Perceptual Organization in Computer Vision, CVPR2004., Dec. 30, 2008, 17 Pages.

Borenstein, et al., "Shape Guided Object Segmentation", In IEEE Computer Society Conference, Computer Society Conference, vol. 1., Jun. 17, 2006, 8 Pages.

Borland, Clarke, "Volumetric Depth Peeling for Medical Image Display", In Visualization and Data Analysis, Jan. 16, 2006, 10 Pages.

Bosch, et al., "Image Classification using Random Forests and Ferns", In the Proceedings of IEEE 11th International Conference on Computer Vision., Oct. 14, 2007, 8 Pages.

Botterill, et al., "Bag-of-Words-driven Single Camera SLAM", In Journal of Field Robotics, vol. 28, Issue 2, Oct. 22, 2010, 28 Pages.

Boykov, Y., et al., "Fast Approximate Energy Minimization Via Graph Cuts", Pattern Analysis and Machine Intelligence, IEEE Transactions on 23.11, 1999, pp. 377-384.

Breen, et al., "Interactive Occlusion and Collision of Real and Virtual Objects in Augmented Reality", In Technical Report of European Computer Industry Research Center—Feb. 1995,, 1995, 22 Pages.

Breiman, et al., "Classification and Regression Trees", Ch. 1, 2, 8, and 11, Monterey, CA: Wadsworth and Brools, 1984, pp. 1-58, 216-265, and 297-317.

Breiman, Leo, "Random Forests—Random Features", In Technical Report 567, University of California, Statistics Department, Berkeley, Sep. 1999, 29 Pages.

Broll, et al., "Toward Next-Gen Mobile AR Games", In Proceedings of IEEE Computer Graphics and Applications, vol. 28, Issue 4, Jul. 9, 2008, 9 Pages.

Bruckner, Groller, "Exploded Views for Volume Data", In IEEE Transactions on Visualization and Computer Graphics, vol. 12, No. 5, Sep. 12, 2006, 13 Pages.

Brunelli, R., "Histogram Analysis for Image Retrieval", In Pattern Recognition, vol. 34, Issue 8, Aug. 1, 2001, pp. 1625-1637.

Bullitt, Aylward, "Volume Rendering of Segmented Tubular Objects", In Proceedings of International Conference on Medical Image Computing and Computer-Assisted Intervention, Oct. 14, 2001, pp. 161-168.

Calonder, et al., "BRIEF: Binary Robust Independent Elementary Features", In Proceedings of the 11th European Conference on Computer Vision: Part IV, Sep. 5, 2010, 14 Pages.

Carmody, Tim, "How Motion Detection Works in Xbox Kinect", Retrieved from Internet:http://gizmodo.com/5681078/how-motion-detection-works-in-xbox-kinect, Nov. 3, 2010, 4 Pages.

Castle, et al., "Towards Simultaneous Recognition,Localization and Mapping for Hand-Held and Wearable Cameras", In Proceedings 2007 IEEE International Conference on Robotics and Automation, Apr. 10, 2007, 6 Pages.

Castle, et al., "Video-Rate Localization in Multiple Maps for Wearable Augmented Reality", In 12th IEEE International Symposium on Wearable Computers., Sep. 28, 2008, 8 Pages.

Chen, et al., "Model Based Object Recognition by Robust Information Fusion", In Proceedings of the 17th International Conference on Pattern Recognition, vol. 3., Aug. 23-26, 2004, 4 Pages.

Cheung, et al., "Robust Background Subtraction with Foreground Validation for Urban Traffic Video", In Journal EURASIP Journal on Applied Signal Processing, vol. 2005, Jan. 1, 2005, 12 Pages.

Chiu, et al., "Improving the Kinect by Cross-Modal Stereo", In Proceedings of 22nd British Machine Vision Conference., Aug. 2011, 10 Pages.

Chum, et al., "Locally Optimized RANSAC", In Proceeding of 25th DAGM Symposium, Sep. 10, 2003, 8 Pages.

Chum, et al., "Total Recall: Automatic Query Expansion with a Generative Feature Model for Object Retrieval", In IEEE 11th International Conference on Computer Vision., Oct. 14-21, 2007, 8 Pages.

Comaniciu, et al., "Mean Shift: A Robust Approach Toward Feature Space Analysis", In IEEE Transactions on Pattern Analysis and Machine Intelligence, vol. 24, Issue 5, May 2002, 17 Pages.

Crandall, et al., "Spatial Priors for Part-Based Recognition Using Statistical Models", In IEEE Computer Society Conference, Computer Vision and Pattern Recognition, CVPR 2005, vol. 1., Jun. 20, 2005, 8 Pages.

Criminisi, et al., "Automatic Semantic Parsing of CT Scans via Multiple Randomized Decision Trees", In Radiological Society of North America (RSNA), PowerPoint presentation., Dec. 2009., 2 Pages.

Criminisi, et al., "Decision Forests with Long-Range Spatial Context for Organ Localization in CT Volumes", In Medical Image Computing and Computer-Assisted Intervention (MICCAI), Sep. 20, 2009, 319 Pages.

(56) References Cited

OTHER PUBLICATIONS

Criminisi, et al., "Decision Forests: A Unified Framework for Classification, Regression, Density Estimation, Manifold Learning and Semi-Supervised Learning", In Journal of Foundations and Trends in Computer Graphics and Vision, vol. 7, Issue 2-3, Feb. 2012, 150 Pages.

Criminisi, et al., "GeoS: Geodesic Image Segmentation", In Proceedings of the 10th European Conference on Computer Vision, Part I, Oct. 20, 2008, 14 Pages.

Criminisi, et al., "Regression Forests for Efficient Anatomy Detection and Localization in CT Studies", In Proceedings of the 2010 International MICCAI Conference on Medical Computer Vision: Recognition Techniques and Applications in Medical Imaging, Sep. 20, 2010, pp. 106-117.

Crow, "Summed-Area Tables for Texture Mapping", In Proceeding of SIGGRAPH '84 11th Annual Conference on Computer Graphics and Interactive Techniques, vol. 18 Issue 3, Jul. 1984, 6 Pages.

Sattler, et al., "Fast Image-Based Localization Using Direct 2D-to-3D Matching", In Proceeding of International Conference on Computer Vision, Nov. 6, 2011, 8 Pages.

Schindler, et al., "City-Scale Location Recognition", In Proceedings of IEEE Conference on Computer Vision and Pattern Recognition, Jun. 17, 2007, 7 Pages.

Schmalstieg, "Crepuscular Rays for Tumor Accessibility Planning", In Journal IEEE Transactions on Visualization and Computer Graphics Archive, vol. 17, Issue 12., Dec. 2011, pp. 2163-2172.

Se, et al., "Vision-Based Global Localization and Mapping for Mobile Robots", In Journal of IEEE Transaction on Robotics, vol. 21, Issue 3, Jun. 2005, 12 Pages.

Seitz, Steven M.., et al., "A Comparison and Evaluation of Mulitview Stereo Reconstruction Algorithms", Proceedings of the 2006 IEE Computer Society Conference on Computer Vision and Pattern Recognition (CVPR'06), Jun. 17, 2006, 8 Pages.

Sequeira, et al., "Automated Reconstruction of 3D Models from Real Environments", Retrieved from: https://www.sciencedirect.com/science/article/pii/S0924271698000264, Feb. 1999, 2 Pages.

Shahar, et al., "Knowledge-Based Visualization of Time-Oriented Clinical Data", In Proceedings of the AMIA Symposium., 1998, 5 Pages.

Sharp, et al., "Camera pose estimation for 3D reconstruction", U.S. Appl. No. 13/749,497, filed Jan. 24, 2013, 27 Pages.

Sharp, Toby, "Implementing Decision Trees and Forests on a GPU", In European Conference on Computer Vision, Lecture Notes in Computer Science, vol. 5305, 2008, pp. 595-608.

Shimizu, et al., "Multi-Organ Segmentation in Three-dimensional Abdominal CT Images", In International Journal of Computer Assisted Radiology and Surgery (J CARS), vol. 1., 2006, 8 Pages.

Shin, et al., "Occlusion Removal Technique for Improved Recognition of Partially Occluded 3D Objects in Computational Integral Imaging", In Journal 3D Research , vol. 1 Issue 2., Jun. 2010, 9 Pages.

Shivappa, et al., "Person Tracking with Audio-Visual Cues Using Iterative Decoding Framework", In Proceedings of IEEE Fifth International Conference on Advanced Video and Signal Based Surveillance, Sep. 1, 2008, pp. 260-267.

Shotion,, et al., "Real-time Human Pose Recognition in Parts from a Single Depth Image", In Proceedings of the 24th IEEE Conference on Computer Vision and Pattern Recognition, Jun. 2011, 8 Pages.

Shotton, et al., "Computing pose and/or shape of modifiable entities", U.S. Appl. No. 13/300,542, filed Nov. 18, 2011, 38 Pages.

Shotton, et al., "Efficient Human Pose Estimation from Single Depth Images", In Proceedings of IEEE Transactions an Pattern Analysis and Machine Intelligence, vol. 35, Issue 12, Jun. 21, 2011, 21 Pages.

Shotton, et al., "Real-Time Human Pose Recognition in Parts from Single Depth Images", In Proceedings of the IEEE Conference on Computer Vision and Pattern Recognition, Jun. 21, 2011, 8 Pages.

Shotton, et al., "Scene Coordinate Regression Forests for Camera Relocalization in RGB-D Images", In Proceedings with IEEE Conference on Computer Vision and Pattern Recognition (CVPR), Jun. 23, 2013, 8 Pages.

Shotton, et al., "Semantic Texton Forests for Image Categorization and Segmentation", In proceedings of IEEE Conference on Computer Vision and Pattern Recognition, Jun. 23, 2008, 8 Pages.

Shotton, et al., "TextonBoost for Image Understanding: Multi-Class Object Recognition and Segmentation by Jointly Modeling Texture, Layout, and Context", In International Journal of Computer Vision, vol. 81, Issue 1, Jan. 2009, 30 Pages.

Silva, et al., "A Survey of GPU-Based Volume Rendering of Unstructured Grids", Revista de Informatica Teorica e Aplicada (RITA), vol. 12, No. 2., 2005, 22 Pages.

Singh, et al., "Parallel Visualization Algorithms: Performance and Architectural Implications", In IEEE Computer Society Press, Computer, vol. 27, No. 7., Jul. 1994, 11 Pages.

Sivic, et al., "Video Google A Text Retrieval Approach to Object Matching in Videos", In Proceedings of the Ninth IEEE International Conference on Computer Vision., 2003, 8 Pages.

Smelyanskiy, et al., "Mapping High-Fidelity Volume Rendering for Medical Imaging to CPU, GPU and Many-Core Architectures", In the Proceedings of IEEE Transactions on Visualization and Computer Graphics, vol. 15, No. 6., Nov. 15, 2009, 8 Pages.

Sminchisescu, et al., "Human Pose Estimation from Silhouettes a Consistent Approach using Distance Level Sets", In Proceedings of WSCG International Conference on Computer Graphics, Visualization and Computer Vision, 2002, 8 Pages.

Strengert, et al., "Large Volume Visualization of Compressed Time-Dependent Datasets on GPU Clusters", Parallel Computing, vol. 31, No. 2, Elsevier Science Publishers, Amsterdam., Feb. 2005, 15 Pages.

Sun, et al., "Conditional Regression Forests for Human Pose Estimation", In Proceedings of the 2012 IEEE Conference on Computer Vision and Pattern Recognition, Jun. 16, 2012, 8 Pages.

Tam, et al., "Volume Rendering of Abdominal Aortic Aneurysms", In the Proceedings of the 8th conference on Visualization '97, Phoenix, Arizona, USA., Oct. 24, 1997, 9 Pages.

Tatarchuk, et al., "Advanced Interactive Medical Visualization on the GPU", In the Journal of Parallel and Distributed Computing, vol. 68 Issue 10,Academic Press, Inc. Orlando, FL, USA., Oct. 2008, 11 Pages.

Taylor, et al., "The Vitruvian Manifold: Inferring Dense Correspondences for One-Shot Human Pose Estimation", In IEEE Conference on Computer Vision and Pattern Recognition, Jun. 16, 2012, 8 Pages.

Thayananthan, et al., "Pose Estimation and Tracking Using Multivariate Regression", In Journal of Pattern Recognition Letters, vol. 29, Issue 9, Oct. 8, 2007, 15 Pages.

Tomandl, et al., "Visualization Techniques for Interactive Direct Volume Rendering in Neuroradiology", RadioGraphies, vol. 21, No. 6 , Nov. 21, 2007, 12 Pages.

Torr, et al., "Outlier Detection and Motion Segmentation", In Sensor Fusion VI, vol. 2059,International Society for Optics and Photonics., Aug. 20, 1993, 12 Pages.

Torralba, "Sharing Visual Features for Multiclass and Multiview Object Detection", In IEEE Transactions on Pattern Analysis and Machine Intelligence., May 29, 2007, 18 Pages.

Totsuka, et al., "Frequency Domain Volume Rendering", In Proceedings of the 20th Annual Conference on Computer Graphics and Interactive Techniques, Sep. 1, 1993, 8 Pages.

Tu, et al., "Brain Anatomical Structure Segmentation by Hybrid Discriminative/Generative Models", Retrieved from: https://www.ncbi.nlm.nih.gov/pmc/articles/PMC2807446/, Apr. 29, 2008, 24 Pages.

Turk, "Eigenfaces and Beyond", Face Processing: Advanced Modeling and Methods, 2005, 29 Pages.

Tykkala, et al., "Direct Iterative Closest Point for Real-Time Visual Odometry", In Proceedings of the IEEE International Conference on Computer Vision Workshops, Nov. 13, 2011, 7 Pages.

Vaughan-Nicholas, "Game-Console Makers Battle over Motion-Sensitive Controllers", In IEEE Computer Society, Computer, Aug. 2009, 3 Pages.

(56) References Cited

OTHER PUBLICATIONS

Vibha, et al., "Classification of Mammograms Using Decision Trees", In Proceedings of IEEE 10th International Database Engineering and Applications Symposium (IDEAS), Computer Society., Dec. 2006.

Vidal, et al., "Pursuit-Evasion Games with Unmanned Ground and Aerial Vehicles", In Proceedings of IEEE Inti Conference on Robotics and Automation, May 2001, 8 Pages.

Viola, et al., "Detecting Pedestrians Using Patterns of Motion and Appearance", In Proceedings of the Ninth IEEE International Conference on Computer Vision, vol. 2., Oct. 13, 2003., 10 Pages.

Viola, et al., "GPU-based Frequency Domain Volume Rendering", In Proceedings of the ACM 20th spring conference on Computer graphics, 2004, 10 Pages.

Viola, et al., "Robust Real-Time Face Detection", Published : In International Journal of Computer Vision, vol. 57, Issue 2, May 2004,, 18 Pages.

Vitter, et al., "Random Sampling with a Reservoir", In Journal ACM Transactions on Mathematical Software, vol. 11 Issue 1., Mar. 1985, 21 Pages.

Waage, et al., "State of the Art Parallel Computing in Visualization using CUDA and OpenCL", The Eurographics Association, Seminar in Visualization., 2008, 7 Pages.

Wald, "Faster Isosurface Ray Tracing Using Implicit KD-Trees", In Journal IEEE Transactions on Visualization and Computer Graphics archive vol. 11 Issue 5., Sep. 11, 2005, 11 Pages.

Wang, et al., "2D Face Fitting-assisted 3D face reconstruction for pose-robust face recognition", In Soft Computing, A Fusion of Foundations, Methodologies and Applications, Springer. Berlin,vol. 15, No. 3, Nov. 8, 2009, pp. 417-428.

Wang, et al., "Viewpoint Invariant 3D Landmark Model Inference from Monocular 2D Images Using Higher-Order Priors", In the Proceedings of the 2011 International Conference on Computer Vision, IEEE Computer Society Washington, DC, USA, Nov. 6-13, 2011, pp. 319-326.

Welch, et al., "Motion Tracking: No Silver Bullet, but a Respectable Arsenal", In IEEE Computer Graphics and Application, vol. 22 Issue 6, Nov. 2002, 15 Pages.

Wels, et al., "A Discriminative Model-Constrained Graph Cuts Approach to Fully Automated Pediatric Brain Tumor Segmentation in 3-D MRI", In International Conference on Medical Image Computing and Computer-Assisted Intervention., Sep. 6, 2008, 8 Pages.

"Final Office Action Issued In U.S. Appl. No. 15/895,990", dated Jan. 15, 2020, 20 Pages.

Non Final Office Action Issued in U.S. Appl. No. 15/895,990, dated May 28, 2020, 19 Pages.

"Decision on Reexamination Issued in Chinese Patent Application No. 201380068406.7", dated Jan. 23, 2020, 11 Pages.

"Final Office Action Issued in U.S. Appl. No. 15/895,990", dated Nov. 4, 2020, 17 Pages.

"Non Final Office Action Issued in U.S. Appl. No. 15/895,990", dated Feb. 19, 2021, 18 Pages.

"Final Office Action Issued in U.S. Appl. No. 15/895,990", dated Jun. 4, 2021, 18 Pages.

* cited by examiner

USING PHOTOMETRIC STEREO FOR 3D ENVIRONMENT MODELING

CROSS REFERENCE TO RELATED APPLICATIONS

The present application is a continuation of U.S. application Ser. No. 13/729,324 filed on Dec. 28, 2012, which is hereby incorporated by reference herein for all intents and purposes.

BACKGROUND

Three-dimensional computer models of a real-world environment are useful in a wide variety of applications. For example, such models can be used in applications such as immersive gaming, augmented reality, architecture/planning, robotics, and engineering prototyping.

There is an ongoing need to improve the realism that can be achieved using such three-dimensional (3D) computer models. However, the amount of realism that can be achieved is constrained by the amount of information available to the computer system about the real world environment and the objects in it. For example, material properties of objects and surfaces in the environment are typically difficult for a computer system to obtain in a fast, accurate and practical manner. Material properties of objects and surfaces include albedo (true color), radiance, irradiance, and other information about the types of materials scene objects consist of.

Existing systems for capturing material properties of objects in the environment typically rely on extensive hardware setups and use multiple controllable light sources and high-speed cameras. Another option is to use light sources and cameras on a gantry that circles the objects whose material properties are being assessed. These types of approaches are time consuming, expensive and difficult for novice users to implement.

The embodiments described below are not limited to implementations which solve any or all of the disadvantages of known equipment and methods for detecting material properties for 3D environment modeling.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Detecting material properties such as reflectivity, true color and other properties of surfaces in a real world environment is described in various examples using a single hand-held device. For example, the detected material properties are calculated using a photometric stereo system which exploits known relationships between lighting conditions, surface normals, true color and image intensity. In examples, a user moves around in an environment capturing color images of surfaces in the scene from different orientations under known lighting conditions. In various examples, surfaces normals of patches of surfaces are calculated using the captured data to enable fine detail such as human hair, netting, textured surfaces to be modeled. In examples, the modeled data is used to render images depicting the scene with realism or to superimpose virtual graphics on the real world in a realistic manner.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term "image element" is used in this document to refer to a pixel, group of pixels, voxel, group of voxels, or other higher level component of an image.

The term "coarse 3D environment model" is used in this document to refer to a representation of a three dimensional real world region comprising objects and surfaces where that representation comprises smoothed approximations of objects and surfaces which do not represent fine detail such as texture of rough surfaces.

Figure 1:
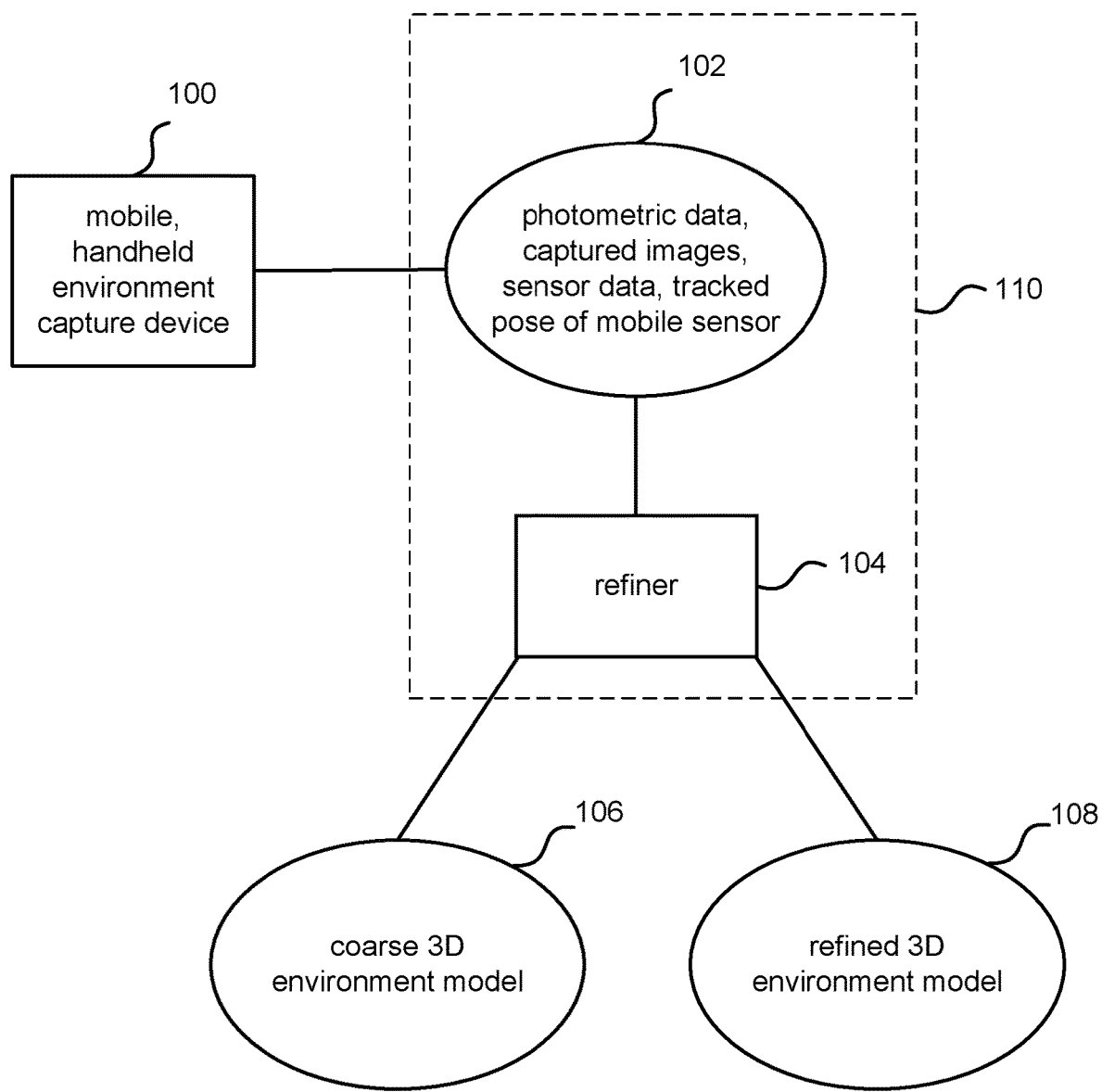
FIG. 1 is a schematic diagram of a system for detecting material properties of an environment and using the detected information to refine a 3D model of the environment.

FIG. 1 is a schematic diagram of a system 110 for detecting material properties for 3D environment modeling. A mobile environment capture device 100, which may be handheld, is used to capture photometric data 102, images, sensor data and also to track its own pose as it moves in an environment. For example, a person may hold the mobile environment capture device 100 whilst walking around a room in order to capture data about the room as described below with respect to FIG. 2. The data that the mobile environment capture device 100 captures comprises at least, high resolution color images captured under known lighting conditions, and data which enables the pose of the mobile environment capture device 100 to be tracked. The high resolution color images may be referred to as photometric data as the color images are captured by the mobile environment capture device 100 for different poses. The pose of the mobile environment capture device 100 may comprise a location and orientation of the device and may be provided as a six degree of freedom pose estimate of the color camera 302. It may comprise transformation parameters (also referred to as registration parameters) for transforms between pairs of depth map frames, or pairs of color images.

The mobile environment capture device 100 captures data which enables its pose to be tracked. For example, the mobile environment capture device 100 may have sensors to track its pose such as a global positioning system, a compass, an accelerometer or other similar sensors to enable pose to be tracked. In some examples, the mobile environment capture device 100 has a depth camera which may be used to capture depth images of the environment from which pose may be tracked. For example, by using an iterative closest point approach as described in US patent publication 20120196679 entitled "Real-Time Camera Tracking Using Depth Maps" Newcombe et al. filed on 31 Jan. 2011 and published on 2 Aug. 2012. The mobile environment capture device 100 may incorporate any suitable image capture device and/or sensors for enabling pose of the device to be tracked.

In the examples described below with reference to FIGS. 2 to 9 the mobile environment capture device 100 has a depth camera which may be used to capture depth images of the environment from which pose may be tracked. However, these examples may be modified to use other types of sensors to enable pose of the mobile environment capture device 100 to be tracked.

The data captured by the mobile environment capture device 100 may be used by a refiner 104 to refine a coarse 3D environment model 106 of the environment in which the device is moving. The coarse 3D environment model 106 may use any representation such as an oct-tree, triangular mesh, truncated signed distance function, or other representation from which an approximation of surfaces in the environment is obtained.

The refiner is computer-implemented using hardware and/or software and it uses the photometric data 102 and tracked pose to refine the coarse 3D environment model 106 and produce a refined 3D environment model 108. The refined 3D environment model is a representation of surfaces in the environment which represents finer detail of at least some parts of those surfaces, as compared with the coarse 3D environment model 106. The refined 3D environment model 106 may use any representation such as an oct-tree, triangular mesh, truncated signed distance function, or other representation.

In the examples described with reference to FIGS. 2 to 9 the mobile environment capture device is used to capture information which is used to create the coarse 3D environment model 106. However, this is not essential. The coarse 3D environment model 106 may be obtained from any source. For example, it may be pre-specified by an operator, it may be retrieved from a database containing location and geometry information.

Figure 2:
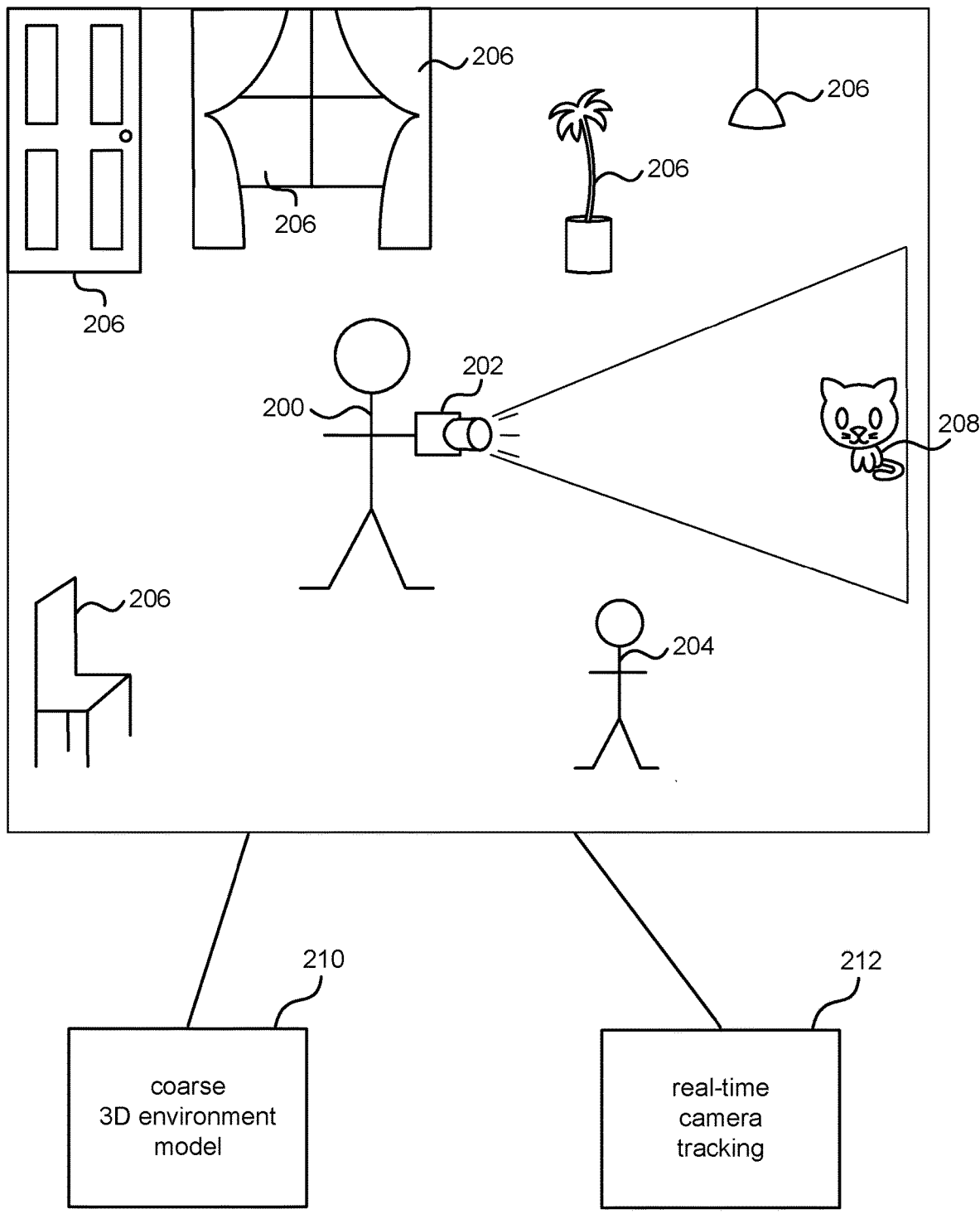
FIG. 2 is a schematic diagram of a person in a room holding a mobile environment capture device which may be used for capturing material properties of surfaces in the room and for real-time tracking.

FIG. 2 is a schematic diagram of a person 200 standing in a room and holding a mobile environment capture device 202 which in this example also incorporates a projector which is projecting the image of a cat 208 into the room. The room contains various objects 206 such as a chair, door, window, plant, light and another person 204. Many of the objects 206 are static although some of the objects such as person 204 may move. As the person moves around the room the mobile environment capture device captures images which are used by a real-time camera tracking system 212 to monitor the location and orientation of a camera (or cameras which are arranged to have co-incident view points) at the mobile environment capture device. The real-time camera tracking system 212 may be integral with the mobile environment capture device 202 or may be at another location provided that it is able to receive communication from the mobile environment capture device 202, either directly or indirectly. For example, the real-time camera tracking system 212 may be provided at a personal computer, dedicated computer game apparatus, or other computing device in the room and in wireless communication with the mobile environment capture device 202. In other examples the real-time camera tracking system 212 may be elsewhere in the building or at another remote location in communication with the mobile environment capture device 202 using a communications network of any suitable type. The mobile environment capture device 202 is also in communication with a coarse 3D model 210 of the environment (which in this case is a 3D model of the room) or another type of map of the environment. For example, images captured by the mobile environment capture device 202 are used to form and build up the coarse 3D model of the environment as the person moves about the room. The real-time camera tracking system 212 may track the position of the camera in relation to the 3D model or map of the environment. The outputs of the real-time camera tracking system 212 and coarse 3D model or map 210 may be used by a game system or other application although that is not essential. For example, a projector at the mobile environment capture device 202 may be arranged to project images depending on the output of the real-time camera tracking system 212 and 3D model 210. For example, the images may be used to seamlessly merge a virtual character into the real scene by using information about material properties of the environment captured by the mobile environment capture device, for example, to correctly model inter-shadowing and reflectivity.

Figure 3:
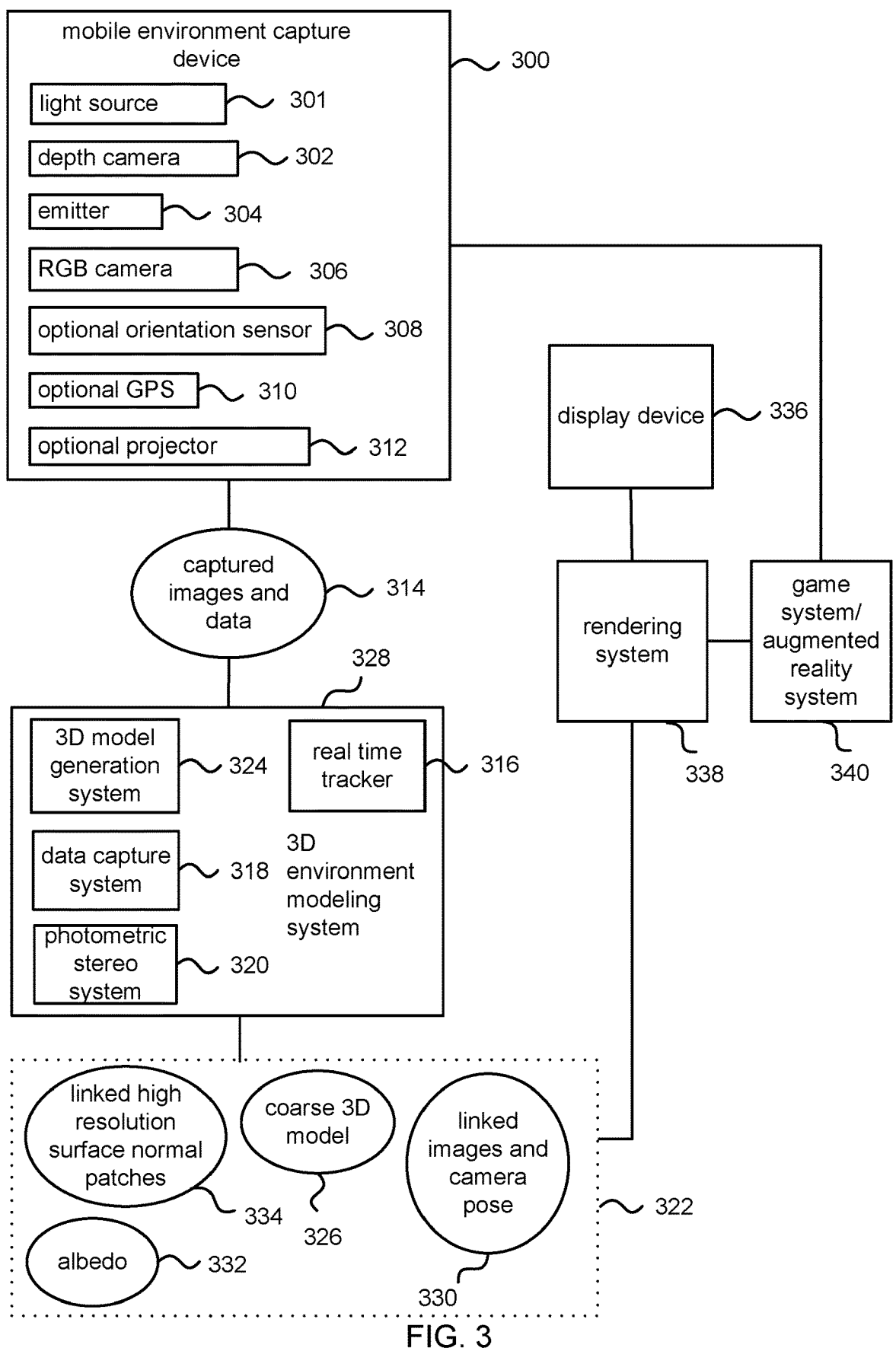
FIG. 3 is a schematic diagram of a mobile environment capture device, a 3D environment reconstruction system and a rendering system which may be used with a game system or augmented reality system.

FIG. 3 is a schematic diagram of a mobile environment capture device 300 for use with a 3D environment modeling system 328, a rendering system 338 and a game system or augmented reality system 340. The mobile environment capture device 300 captures images and data 314 as described above with reference to FIG. 1. The captured data 314 is used by a 3D environment modeling system 328 to refine and optionally also create, a 3D model 326 of the environment in which the mobile environment capture device 300 moved when it captured the captured data 314. A rendering system 338 is able to use the 3D model and associated data 322 to render images at a display device 336 or at a game system or augmented reality system 340. For example, to re-render the captured environment with increased realism and detail as compared with previous approaches. For example, to superimpose virtual graphics over the real world while correctly modeling inter-shadowing, reflectivity and other material properties. It is also possible to modify the appearance of real objects by projecting an image onto them which is pre-calibrated to take geometry, true color and lighting into consideration.

More detail about the mobile environment capture device 300 is now given. The mobile environment capture device 300 optionally comprises a depth camera 302 which is arranged to capture sequences of depth images of a scene. For example, a depth camera may be incorporated in the capture device 300 where the coarse 3D model is to be constructed using depth images captured by the capture device 300. In embodiments where the coarse 3D model is available from other sources the depth camera 302 may be omitted.

Each depth image (also called a depth map frame) 314 comprises a two dimensional image in which each image element comprises a depth value such as a length or distance from the camera to an object in the captured scene which gave rise to that image element. This depth value may be an absolute value provided in specified units of measurement such as meters, or centimeters or may be a relative depth value. In some cases the depth value may be a disparity value such as in situations where stereo depth information is available. In each captured depth image there may be around 300,000 or more image elements each having a depth value. The frame rate is high enough to enable the depth images to be used for working robotics, computer game or other applications. For example, at least 20 frames per second.

The depth information may be obtained using any suitable technique including but not limited to, time of flight, structured light, stereo images. In some examples the depth camera is able to organize the depth information into Z layers that are perpendicular to a Z axis extending along a line of sight of the depth camera.

The mobile environment capture device 300 may also comprise an emitter 304 arranged to illuminate the scene in such a manner that depth information may be ascertained by the depth camera 302. For example, in the case that the depth camera 302 is an infra-red (IR) time-of-flight camera, the emitter 304 emits IR light onto the scene, and the depth camera 302 is arranged to detect backscattered light from the surface of one or more objects in the scene. In some examples, pulsed infrared light may be emitted from the emitter 304 such that the time between an outgoing light pulse and a corresponding incoming light pulse may be detected by the depth camera and measure and used to determine a physical distance from the environment sensor 300 to a location on objects in the scene. Additionally, in some examples, the phase of the outgoing light wave from the emitter 304 may be compared to the phase of the incoming light wave at the depth camera 302 to determine a phase shift. The phase shift may then be used to determine a physical distance from the mobile environment sensor 300 to a location on the objects by analyzing the intensity of the reflected beam of light over time via various techniques including, for example, shuttered light pulse imaging.

In another example, the mobile environment sensor 300 can use structured light to capture depth information. In such a technique patterned light (e.g. light displayed as a known pattern such as a grid or stripe pattern) may be projected onto a scene using the emitter 304. Upon striking the surface of objects in the scene the pattern becomes deformed. Such a deformation of the pattern is captured by the depth camera 302 and analyzed to determine an absolute or relative distance from the depth camera 302 to the objects in the scene. In some cases, the mobile environment sensor 300 emits a spatially varying and/or time varying pattern of electromagnetic radiation and that pattern is calibrated so that when an image is received by the depth camera 302 it is able to perform pattern matching against a database of patterns and thus calculate depth information. This can be thought of as a 3D pattern of dots being projected into the environment, and wherever there is a surface that pattern is reflected so the depth camera 302 can detect it and calculate the distance of that surface from the depth camera 302.

In another example, the depth camera 302 comprises a pair of stereo cameras such that visual stereo data is obtained and resolved to generate relative depth information. In this case the emitter 304 may be used to illuminate the scene or may be omitted.

The mobile environment sensor 300 comprises a high resolution color video camera referred to as an RGB camera 306. The RGB camera 306 is arranged to capture sequences of images of the scene at visible light frequencies.

In embodiments where a depth camera and a color camera are present in the mobile environment capture device 300, the depth camera and the color camera may be arranged to share the same optical axis and optionally also the same principle point and field of view. However, this is not essential. Any set up and calibration process which enables the captured depth images to be mapped to the captured color images may be used. This may be achieved by using a single camera which is designed to capture both color and depth information. It is also possible to use more than one camera and arrange the optical axes of the cameras to be aligned by use of prisms, mirrors or other optical axis alignment equipment.

In some embodiments the mobile environment capture device 300 comprises other sensors, for example, to enable pose of the mobile environment capture device 300 to be tracked. For example, the mobile environment sensor 300 may comprise an orientation sensor 308 such as an inertial measurement unit (IMU), accelerometer, gyroscope, compass or other orientation sensor 308. The mobile environment sensor 300 may comprise a location tracking device such as a GPS although this is not essential.

The mobile environment capture device 300 may comprise a projector 312 as mentioned above with reference to FIG. 2 although this is not essential.

The mobile environment capture device 300 also comprises one or more processors, a memory and a communications infrastructure as described in more detail below.

The mobile environment capture device 300 may be provided in a housing which is shaped and sized to be hand held by a user or worn by a user. In other examples the mobile environment capture device 300 is sized and shaped to be incorporated or mounted on a vehicle, toy or other movable apparatus.

The mobile environment capture device 300 may be connected to a 3D environment modeling system 328. This connection may be a physical wired connection or may use wireless communications. In some examples the mobile environment capture device 300 is connected indirectly to the 3D environment modeling system 328 over one or more communications networks such as the internet.

The 3D environment modeling system 328 is computer implemented using a general purpose microprocessor controlling one or more graphics processing units (GPUs). It comprises a real time tracker 316, a data capture system 318, a photometric stereo system 320 and optionally, a 3D model generation system 324.

The real-time tracker 316 computes the pose of the camera, or optical axis aligned cameras, of the mobile environment capture device 300. This may be achieved using depth map frames (where a depth camera is available), using orientation sensors (where available) or in other ways. For example, the real time tracker 318 produces a real-time series of six degree of freedom pose estimates of the color camera 302. It may also produce transformation parameters (also referred to as registration parameters) for transforms between pairs of depth map frames, or pairs of color images.

The data capture system 318 implements a data capture strategy to decide which captured images and other data are to be saved, and to save that information in a manner which conserves space and facilitates real time operation. More detail about an example data capture system 318 is given below with reference to FIGS. 6 and 7.

The photometric stereo system 320 uses images and data captured by the data capture system 318 to compute material properties, and/or surface normals of fine scale patches of surfaces depicted in the images. The computed material properties and/or surface normals may be used to refine a coarse 3D model of the environment 326. More detail about an example photometric stereo system 320 is given below with reference to FIGS. 5 and 8.

The 3D model generation system 324 is optional because it is not needed in examples where the coarse 3D model 326 is available from another source. In examples where the coarse 3D model 326 is constructed by the 3D environment modeling system 328 the 3D model generation system 324 may aggregate information from captured depth map frames to form the coarse 3D model 326. This may be achieved as described in US patent publication 20120194516 entitled "Three-dimensional environment reconstruction" Newcombe et al. filed on 31 Jan. 2011 and published on 2 Aug. 2012. An example of a method of aggregating information from captured depth map frames to form the coarse 3D model is given below.

The output 322 of the 3D environment modeling system 328 comprises a coarse 3D model of the environment 326 (in examples where the 3D model generation system generates that), color images and camera poses 330 with links to associated locations in the coarse 3D model 326, optional material properties such as albedo 332 (also referred to as true color), and surface normals 334 at a high resolution for at least some specified surface patches of the coarse 3D model 326. Because the surface normals 334 are at a high resolution, fine detail of environment surfaces may be represented. By combining the surface normals 334 at high resolution with the coarse 3D model 326 a refined 3D environment model is obtained as described above with reference to FIG. 1. The functionality of the refiner 104 of FIG. 1 is provided by at least part of the 3D environment modeling system 328. The process of combining the surface normals 334 with the coarse 3D model may comprise bump-mapping by looking up the high resolution surface normals for surface patches of the coarse 3D model as required. In other examples, the process of combining the surface normals 334 with the coarse 3D model may comprise computing a new 3D model using the knowledge of the high resolution surface normals. For example, computing a smooth function which represents the surfaces in the environment and which takes into account the high resolution surface normals. The outputs 322 of the 3D environment modeling system 328 may be stored in GPU memory and/or in other types of memory as described in more detail below.

The mobile environment capture device 300 may be used in conjunction with a rendering system 338 (and display device 336) and a game system or augmented reality system 340. For example, the game may be a golf game, boxing game, motor car racing game or other type of computer game. Data from the game system 340 such as the game state or meta data about the game may be provided to the real-time tracker 316. Output 322 from the 3D environment modeling system 328 may be used by the game system/augmented reality system 340 to influence the course of a game or to influence how a virtual graphic is superimposed over the real world. Information from the 3D model may also be used by the game system 332 to influence the course of a game.

The processing performed by the 3D environment modeling system 328 and or the rendering system 338 can, in one example, be executed remotely from the location of the mobile environment capture device 300. For example, the mobile environment capture device 300 can be connected to (or comprise) a computing device having relatively low processing power, and which streams the captured images and data 314 over a communications network to a server. The server has relatively high processing power, and performs the computationally complex tasks of the 3D environment modeling system 328 and/or rendering system 338. The server can return a rendered image of the refined 3D model per-frame to provide an interactive experience to the user, and also return the final refined 3D model on completion of the model, for subsequent local use (e.g. in a game). Such an arrangement avoids the need for the user to possess a high-powered local computing device.

An example of a method of aggregating information from captured depth map frames to form the coarse 3D model is now given. A 3D model of a real-world environment may be generated in a 3D volume made up of voxels stored on a memory device. The model may be built from data describing a camera location and orientation and a depth image with pixels indication a distance from the camera to a point in the environment. A separate execution thread may be assigned to each voxel in a plane of the volume. Each thread uses the camera location and orientation to determine a corresponding depth image location for its associated voxel, determine a factor relating to the distance between the associated voxel and the point in the environment at the corresponding location, and updates a stored value at the associated voxel using the factor. Each thread iterates through an equivalent voxel in the remaining planes of the volume, repeating the process to update the stored value. The update may comprise an aggregation process and the stored value may be a value of a truncated signed distance function representing distance from the voxel to a surface depicted in the volume.

The 3D model may be stored in GPU memory or in other ways. For example, the dense 3D model may be stored as a linear array in slice-row-column order, optionally with some padding so that slices and rows align certain memory block sizes. For example, the model may be stored as a linear array of memory locations used to represent a 3D volume. This may be achieved by mapping each voxel (or other 3D image element such as a group of voxels) to a memory array index using a linear pitched memory which provides fast, parallel access to the data stored on the parallel computing unit memory. Each voxel may store a numerical value of a truncated signed distance function which may be zero at a surface represented by the model, positive outside objects represented by the model and negative inside objects represented by the model, where the magnitude of the numerical value is related to depth from the closest surface represented by the model.

Figure 4:
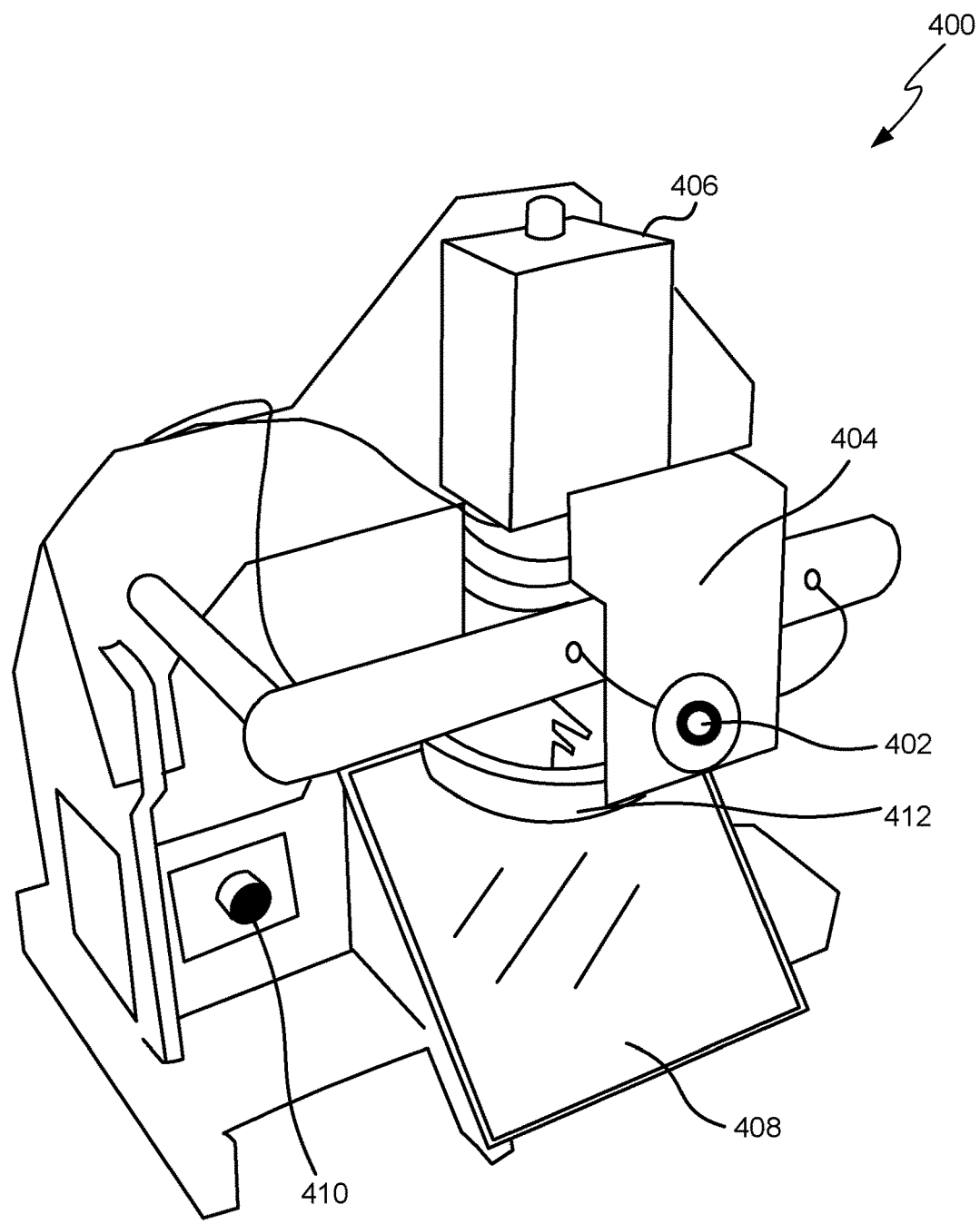
FIG. 4 is a perspective view of a hand held mobile environment capture device.

FIG. 4 is a perspective view of a hand held mobile environment capture device 400 suitable for use in the embodiments described above with reference to FIGS. 1 to 3. This is an example only as many other configurations and arrangements of the device may be used to achieve the same functionality. In particular, camera technology which combines depth and color in a smaller form factor may be used. Also, other arrangements of cameras may be used where the optical axes of the cameras are aligned using other equipment or arrangements of equipment.

In the example shown in FIG. 4 a high resolution color camera 406 with lens 412 is supported in a housing so that its optical axis is substantially vertical and approximately at 45 degrees to the plane of a cold mirror 408. Visible light from the environment is reflected from the cold mirror 408 into the color camera 412. A depth camera is also supported in the housing so that its optical axis is aligned with that of the color camera 412 by virtue of the cold mirror 408. The depth camera is not visible in FIG. 4 as it is located behind the cold mirror 408. Infra-red illumination reflected from surfaces in the environment, passes through the cold mirror 408 and into the depth camera. An infra-red laser 410 emits infer-red illumination into the environment which is then scattered and reflected into the depth camera. A point light source, which may be a high brightness light emitting diode 402 is mounted on a heat sink 404 attached to the housing. The position of the light emitting diode 402 is known with respect to the cameras.

Figure 5:
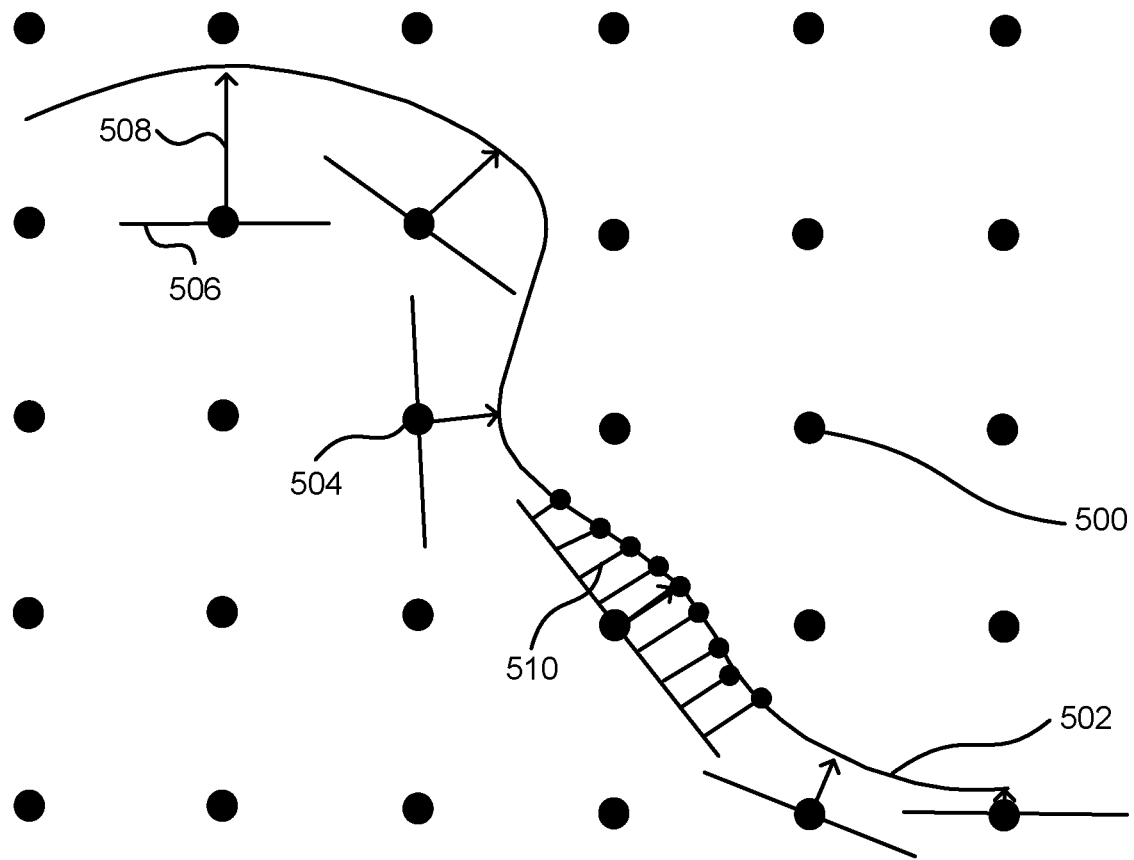
FIG. 5 is a schematic diagram of part of a 3D environment model.

FIG. 5 is a schematic diagram of part of a 3D environment model comprising a plurality of voxels 500 or other volumetric image elements. In this example, the model stores a truncated signed distance function representing surfaces in the environment. Each voxel may store a numerical value which may be zero at a surface represented by the model, positive outside objects represented by the model and negative inside objects represented by the model, where the magnitude of the numerical value is related to depth from the closest surface represented by the model. In the example shown in FIG. 5 part of a surface represented by the model is depicted by the curved line 502. In the example, six voxels which are close to the surface 502 are shown with arrows drawn from the centre of those voxels to the closest part of the truncated signed distance function represented by curved line 502. For example, voxel 504 has an arrow from its centre to the curved line 502. Each of these six voxels also have a line drawn through them which is perpendicular to the arrow to the curved line 502. For example line 506 is perpendicular to arrow 508.

The truncated signed distance function represented by curved line 502 is a smoothed approximation of the real world surface it represents. This is because the voxels are discrete and the curved line 502 is obtained by interpolating voxel values. Also, the voxel values may be obtained using an aggregation process which acts to smooth out fine detail. Because of this, the truncated signed distance function may not be able to represent fine detail such as netting, fur, hair, liquids, rough surfaces and other fine texture.

To enable fine texture to be represented, the photometric stereo system 320 may be used to compute surface normals at a higher resolution than available in the coarse 3D environment model. For example, the surface normals may be computed from diffuse reflections from the real world surface as seen by the color camera from multiple camera positions (with known lighting). For example, lines 510 in FIG. 5 indicate a plurality of positions within a single voxel. For each of those positions (which relates to a position in the real world) a surface normal is computed by the photometric stereo system 320. The surface normal indicates the orientation of a small region of the real world surface. By computing a surface normal for each of the lines 510, and for voxels close to the curved line 502 (which represents the real world surface), it is possible to represent finer detail than previously possible.

As the color images are high resolution, memory will quickly be used if unlimited color images are stored. Also, to enable processing at real time rates, the appropriate color images and camera poses associated with those images need to be quickly accessible by the photometric stereo system 320. An example of a memory structure and associated data capture strategy which may be used are now described with reference to FIGS. 6 and 7.

Figure 6:
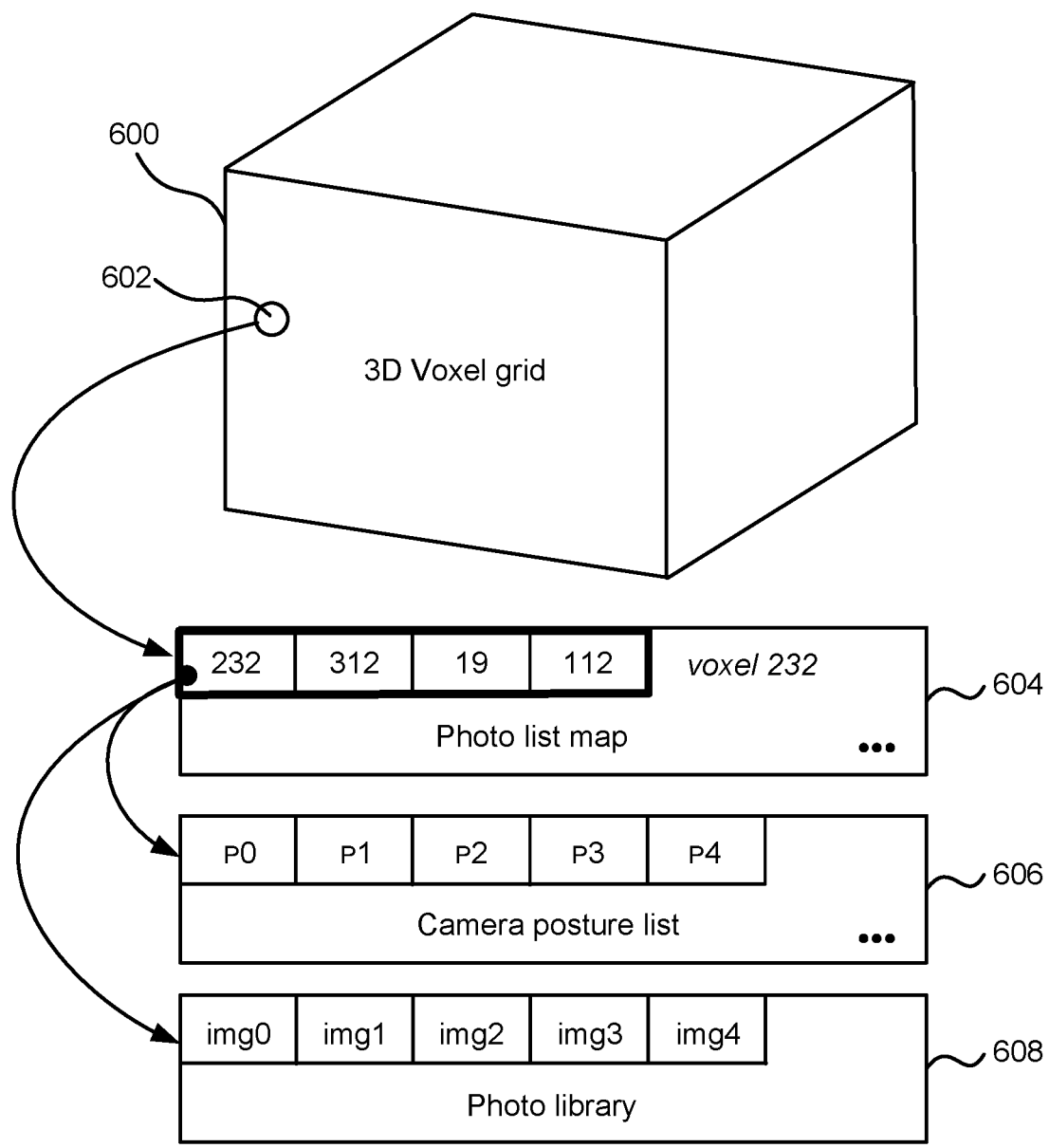
FIG. 6 is a schematic diagram of a 3D environment model having links to associated images.

In the example shown in FIG. 6 a 3D voxel grid 600 is stored in GPU memory and holds a truncated signed distance function representing surfaces in the real environment as described above. Each voxel 602 in the 3D voxel grid 600 stores a truncated signed distance function value and a pointer to an array of pointers 604 to associated color images. Each entry in the array of pointers 604 stores a pointer to a camera posture list 606 and a pointer to color images associated with the voxel 602. The color images associated with the voxel 602 selected for storage using a data capture strategy which is now described with reference to FIG. 7.

Figure 7:
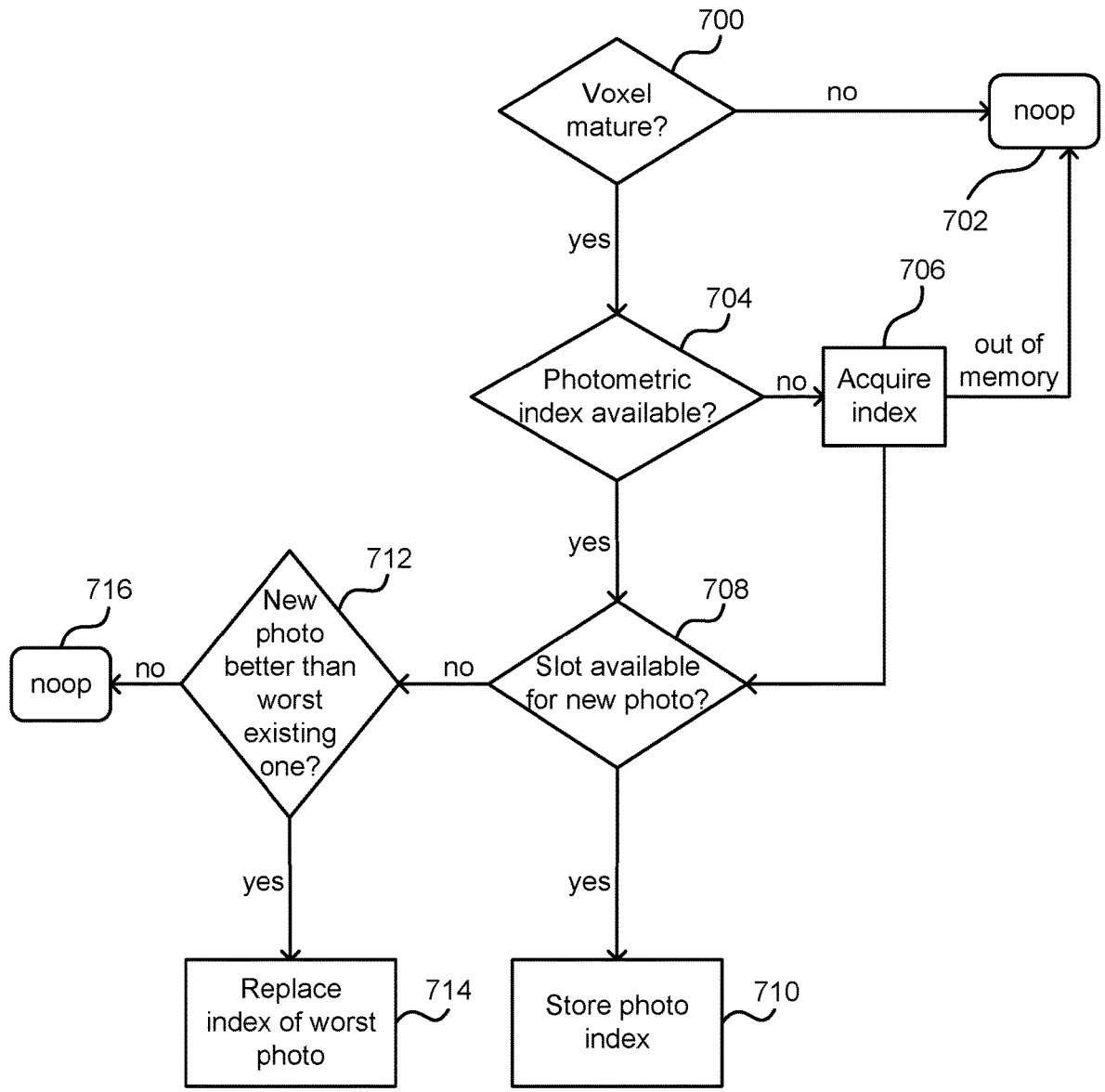
FIG. 7 is a flow diagram of a method of data capture.

The data capture strategy is carried out for one or more voxels of the 3D voxel grid 600. For example, voxels which are close to the truncated signed distance function such as the six voxels discussed above with reference to FIG. 5 are selected. For each selected voxel the process of FIG. 7 is carried out during color image capture. For example, where the mobile environment capture device is used to construct the coarse 3D environment model, a user may walk around in the environment until the coarse 3D environment model is established. The user may then activate the color camera and continue to walk around in the environment to refine the 3D environment model using photometric data.

The data capture strategy checks whether the selected voxel is mature 700. That is, has the truncated signed distance function value been established for this voxel? If not, no action is taken 702 so that it is possible to wait for another process, which is constructing the truncated signed distance function, to proceed. This step may be omitted where the coarse 3D environment model is known to be available. If the voxel is mature, a check 704 is made as to whether a photometric index is available. The photometric index is a pointer stored at the voxel which points to the array of pointers 604. If no photometric index is available an index is acquired 706 by allocating a pointer to the voxel. If the index cannot be acquired, for example, if there is no memory left, the process returns to the inactive state 702. If the index is successfully acquired, a check 708 is made as to whether a slot is available for a new photo. If so, a photo index 710 is stored in the array of pointers 604 which points to a photo slot in a photo library 608. If no slot is available then a decision is made 712 as to whether the new photo is better than the worst existing photo stored for the voxel. The criteria for selecting better photos may be any one or more of: whether the voxel is depicted towards the center of the photo, whether the camera pose is fronto-parallel to the truncated signed distance function at the voxel, how close the camera is to the surface depicted at the voxel, or other criteria. For example, any criteria related to any one or more of:

distance between the center of the image and the voxel;
distance between the camera and the surface depicted by the voxel;
relationship between the camera pose and the surface depicted by the voxel.

If the new photo is determined to be better than the worst existing photo, it is used to replace 714 the worst existing photo. Otherwise no action is taken 716.

If the depth and color cameras are not perfectly aligned and calibrated, high angles between camera ray and surface can yield incorrect and strongly distorted photometric samples. Thus, in some examples, color images captured from a steep angle may be excluded. For example, a threshold camera ray to surface angle may be used to select which color images are stored.

Figure 8:
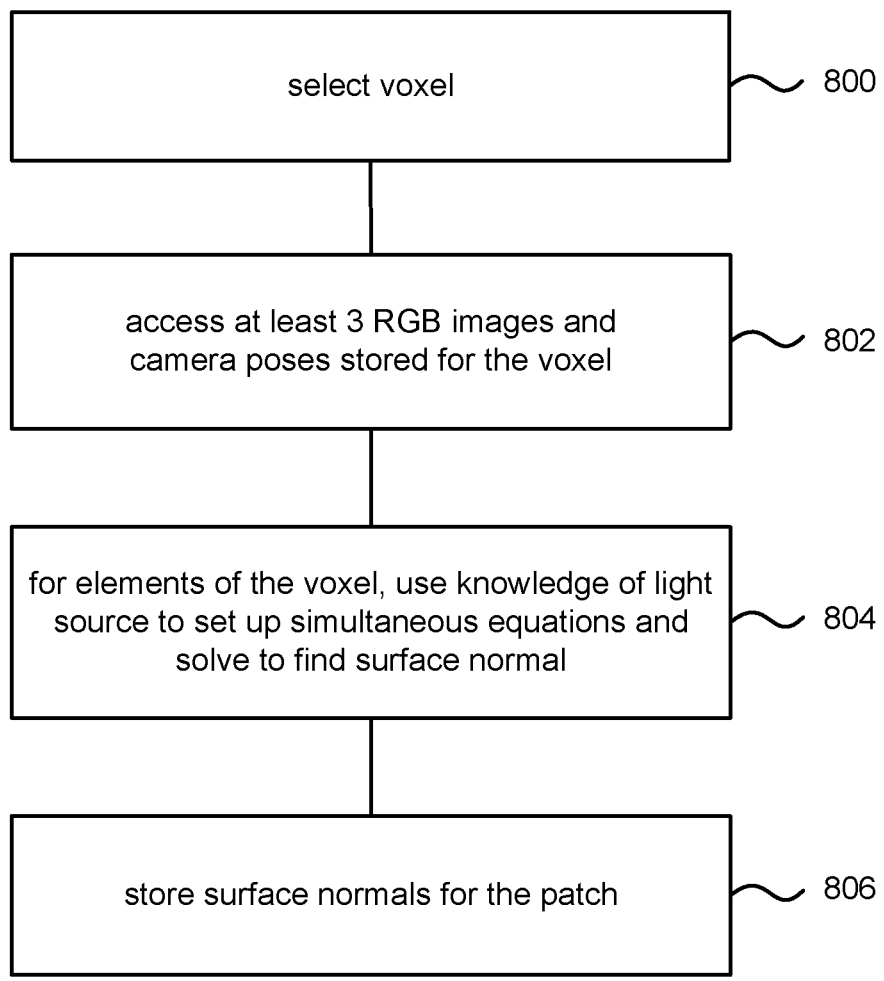
FIG. 8 is a flow diagram of a method at a photometric stereo system.

FIG. 8 is a flow diagram of an example method at the photometric stereo system 320 of FIG. 3. This process may be implemented in parallel at the graphics processing unit or other parallel processing unit.

Photometric stereo is a process for estimating surface normals of a surface in the environment by observing that surface under different lighting conditions. A known approximate relationship exists between light intensity in the environment, the light direction, the surface normal of a patch of a surface in the environment being considered, and the true color of that patch. This approximate relationship may be a simplified model of light transport as used in computer graphics. For example, this approximate relationship may be expressed as:

A vector representing light direction, multiplied by a vector representing the surface normal of the patch, the result of the product having added to it the true color of the patch, equals the light intensity observed at the patch.

This approximate relationship or other more complex versions of it may be used by the photometric stereo system.

By using at least three of the high resolution color images, taken of a particular surface patch, from different camera poses it is possible to set up three simultaneous equations using the above relationship. The light intensity observed at the patch is obtained from the color images and the light direction is known from the known position of the light emitting diode on the mobile environment capture device. The true color of the patch may not be known. By solving the simultaneous equations an estimate of the surface normal is obtained. This estimate may comprise some error and give workable results. For example, an assumption is made that the image capture occurs in an environment that is completely dark aside from the lighting contribution stemming from the known light sources, or in an environment with ambient lighting conditions which may be calibrated for.

The light intensity observed at the patch is known to vary (attenuate) depending on the distance to the surface that is illuminated and depending on the angle of the emitted ray. This attenuation may be compensated by making appropriate calculations at the photometric stereo system.

With reference to FIG. 8 the photometric stereo system may select 800 a voxel for which surface normals are to be calculated from photometric stereo. As described with reference to FIG. 5 voxels close to, or adjacent to the surface represented in the coarse 3D environment model may be selected. The photometric stereo system access 802 at least three color images and associated camera poses stored for the voxel. The camera poses of the three color images are different. Each color image depicts the voxel as described above.

A plurality of elements of the voxel are selected, for example, positions within the voxel which lie on a plane that is substantially fronto-parallel to the surface depicted by the voxel. For each of the elements, simultaneous equations are calculated 804 to obtain an estimate of the surface normal depicted at that element. The simultaneous equations are set up and calculated as described above. The estimated surface normals for the elements are stored 806 for the patch. These may be stored in GPU memory or elsewhere.

Figure 9:
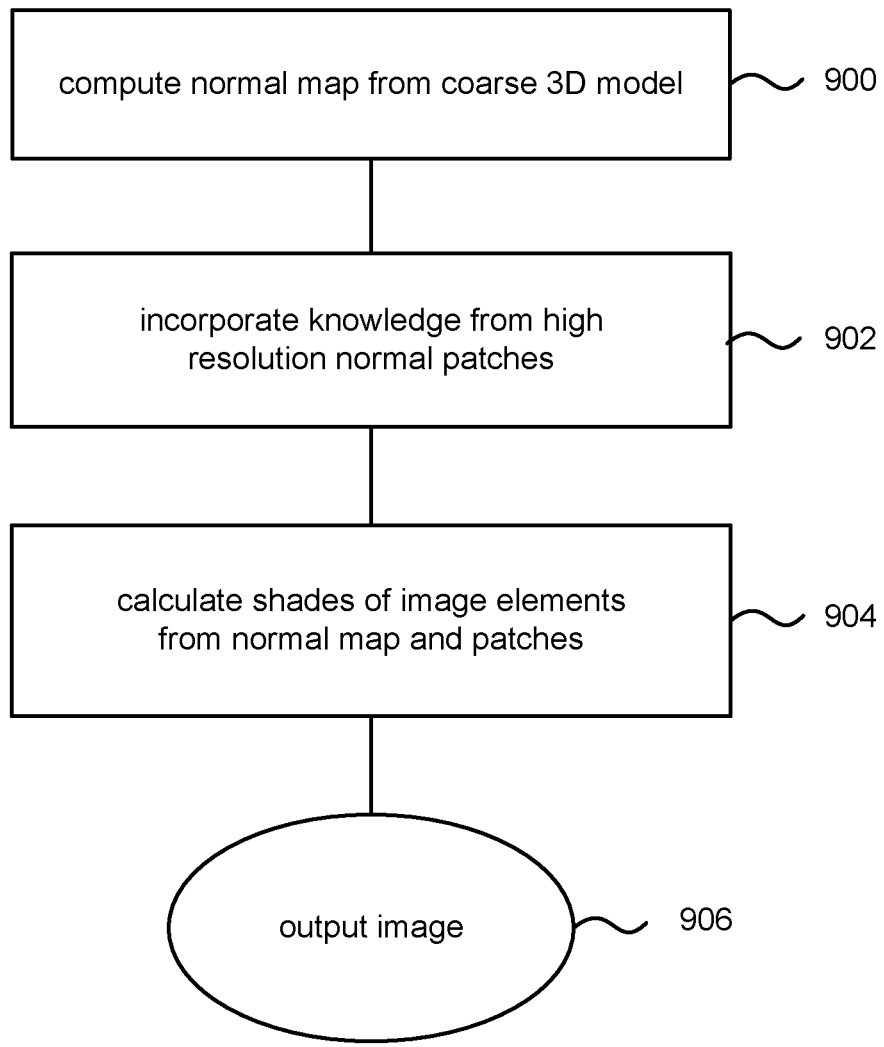
FIG. 9 is a flow diagram of a method at a rending system.

FIG. 9 is a flow diagram of a method at a rending system. The rendering system is able to compute 900 a normal map from the coarse 3D model. Any suitable method of computing the normal may be used. For example, a method is described in US patent publication 20120194516 entitled "Three-dimensional environment reconstruction" Newcombe et al. filed on 31 Jan. 2011 and published on 2 Aug. 2012. Once a normal map is available, computer graphics techniques may be used to render an image. For example, image element shades (colors) may be calculated from the normal map. A normal map is a two dimensional array (in the form of an image) where each array element stores a value representing a surface normal of a surface depicted by an image corresponding to the normal map. A normal map may be stored in any form, not necessarily as a two dimensional array.

The rendering system incorporates into the normal map, knowledge from the high resolution normal patches calculated by the photometric stereo system. Thus some patches of the normal map effectively have a higher resolution. The rendering system calculates 904 shades of image elements of an image to be rendered. When calculating the shades the rendering system takes into account the surface normals of the patches from the photometric stereo system. In this way an output image 906 is obtained which may be displayed at any suitable display.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 10:
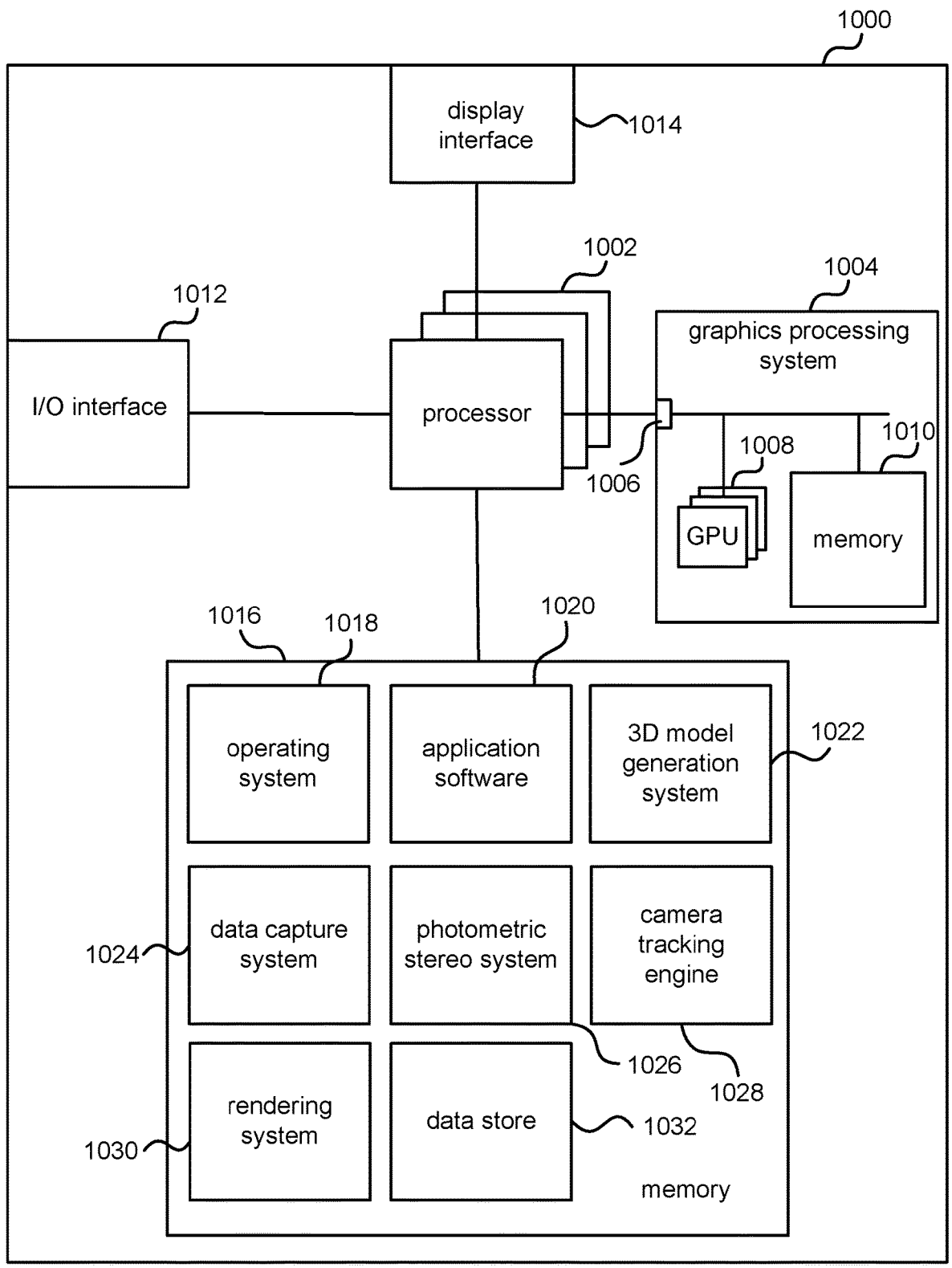
FIG. 10 illustrates an exemplary computing-based device in which embodiments of a system for detecting material properties for 3D environment modeling may be implemented.

FIG. 10 illustrates various components of an exemplary computing-based device 1000 which may be implemented as any form of a computing and/or electronic device, and in which embodiments of a 3D environment modeling and rendering system may be implemented.

Computing-based device 1000 comprises one or more processors 1002 which may be microprocessors, controllers or any other suitable type of processors for processing computing executable instructions to control the operation of the device in order to provide a 3D environment modeling and rendering system. In some examples, for example where a system on a chip architecture is used, the processors 1002 may include one or more fixed function blocks (also referred to as accelerators) which implement a part of the method of 3D environment modeling and rendering in hardware (rather than software or firmware).

The computing-based device 800 also comprises a graphics processing system 1004, which communicates with the processors 1002 via a communication interface 1006, and comprises one or more graphics processing units 1008, which are arranged to execute parallel, threaded operations in a fast and efficient manner. The graphics processing system 1004 also comprises a memory device 1010, which is arranged to enable fast parallel access from the graphics processing units 1008. In examples, the memory device 1010 can store the 3D environment model, and the graphics processing units 1008 may perform any part or combination of the model generation, image rendering and photometric stereo calculations described above.

Platform software comprising an operating system 1018 or any other suitable platform software may be provided at the computing-based device to enable application software 1020 to be executed on the device. Other software than may be executed on the computing device 1000 comprises: 3D model generation system 1022, data capture system 1024, photometric stereo system 1026, camera tracking engine 1028, rending system 1030. A data store 1032 is provided to store data such as previously received depth maps, color images, sensor data, registration parameters, user configurable parameters, other parameters, 3D environment models, game state information, game metadata, and other data.

The computing-based device 1000 comprises one or more input/output interfaces 1012 arranged to receive and process input from one or more devices, such as user input devices (e.g. mobile environment capture device, a game controller, a keyboard, a mouse). This user input may be used to control software applications or mobile environment capture. The input/output interface 1012 may also operate as a communication interface, which can be arranged to communicate with one or more communication networks (e.g. the internet). The input/output interface 1012 may output files, images or data in other forms.

A display interface 1014 is also provided and arranged to provide output to a display system integral with or in communication with the computing-based device. The display system may provide a graphical user interface, or other user interface of any suitable type although this is not essential. In an example, the display device 1014 may also act as the user input device if it is a touch sensitive display device.

In some examples the input/output interface 1012 may detect voice input, user gestures or other user actions and may provide a natural user interface (NUI). This user input may be used to control a game or other application. The output interface may also output data to devices other than the display device, e.g. a locally connected printing device.

The input/output interface 1012 and display interface 1014 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Computer executable instructions may be provided using any computer-readable media that is accessible by computing based device 1000. Computer-readable media may include, for example, computer storage media such as memory 1016 and communications media. Computer storage media, such as memory 1016, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1016) is shown within the computing-based device 1000 it will be appreciated that the storage may be distributed or located remotely and accessed via a network or other communication link.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A mobile capture device, comprising:
a housing;
a high brightness point light source fixed at the housing at a known position;
an input interface arranged to perform at least one of accessing or generating a coarse three-dimensional (3D) model of an environment, the coarse 3D model of the environment being generated in a 3D volume made up of images stored in memory;
a single image capture device supported by the housing and arranged to capture a plurality of color images as the single image capture device moves in the environment, one or more of the plurality of color images corresponding to one or more of the images stored on the memory, the one or more of the plurality of color images depicting surfaces in the environment from different locations and orientations of the single image capture device with respect to the surfaces and illuminated by the high brightness point light source;
a processing unit arranged to, based on determining that the one or more of the plurality of color images are higher quality than the one or more of the plurality of corresponding images, replace the one or more of the plurality of corresponding images stored in the memory with the one or more of the plurality of color images;
at least one sensor arranged to capture data to track location and orientation of the single image capture device for each of the plurality of color images, the captured data comprising photometric data captured under known lighting conditions from the high brightness point light source enabling a pose of the mobile capture device to be tracked, wherein the photometric data comprises at least the plurality of color images having been captured for a plurality of poses, each of the plurality of poses comprising a location and an orientation of the mobile capture device; and
a communications interface arranged to transfer the plurality of color images and the captured photometric data to a photometric stereo system to refine the coarse 3D model to create a refined three-dimensional (3D) model of the environment, based at least in part on the replacing of the one or more of the plurality of corresponding images using a photometric stereo system, the refined 3D model comprising surface normals combined with the coarse 3D model;
the refined 3D model of the environment comprising a representation of at least one patch of at least one surface, the representation depicting the at least one patch of the at least one surface with higher quality than in the coarse 3D model of the environment, and the representation of the at least one patch of the at least one surface further depicting at least one material property of the surface;
the photometric stereo system arranged to use the photometric data to compute the at least one material property of the at least one patch of the at least one surface, the at least one material property comprising information about types of materials within the environment;
wherein the photometric stereo system uses a known approximate relationship between a true color of a patch of a surface in the environment and one or more of the following: a light intensity in the environment, a light direction in the environment, and a surface normal of the at least one patch of the at least one surface in the environment; and
wherein the photometric stereo system is arranged to compensate for an attenuation in the light intensity observed at the patch in response to the different locations and orientations of the single image capture device with respect to the surfaces, the attenuation depending on at least a distance to the at least one patch of the at least one surface that is illuminated and an angle of a ray of light emitted from the high brightness point light source.

2. The mobile capture device as claimed in claim 1, wherein an expression of the known approximate relationship comprises a simplified model of light transport as used in computer graphics.

3. The mobile capture device as claimed in claim 2, further comprising a real-time tracker configured to:
use at least three color images of the plurality of color images taken of the patch, each of the at least three color images taken from a different pose of the mobile capture device; and
solve three equations simultaneously, each of the three equations using the expression of the known approximate relationship to calculate an estimate of the surface normal.

4. The mobile capture device as claimed in claim 1, wherein the single image capture device is arranged to capture depth images using a same optical axis that is used to capture the plurality of color images.

5. The mobile capture device as claimed in claim 1, wherein the single image capture device is a color camera, and wherein the mobile capture device further comprises a second image capture device that is a depth camera.

6. The mobile capture device as claimed in claim 5, further comprising optical axis alignment equipment arranged to align an optical axis of the single image capture device and the second image capture device.

7. The mobile capture device as claimed in claim 1, further comprising an emitter configured to emit infrared light onto a scene in the environment; and
wherein the higher quality comprises having improved realism and finer detail compared to the coarse 3D model of the environment; and
the at least one material property is different than the surface normals.

8. A method for detecting material properties for three-dimensional environment modeling using a single mobile image capture device, the method comprising:
illuminating an environment using a high brightness point light source;
performing at least one of accessing or generating a coarse three-dimensional (3D) model of an environment, the coarse 3D model of the environment being generated in a 3D volume made up of images stored in memory;
capturing a plurality of color images as the single mobile image capture device moves in the environment, one or more of the plurality of color images corresponding to one or more of the images stored on the memory, the one or more of the plurality of color images depicting surfaces in the environment from different locations and orientations of the single mobile image capture device with respect to the surfaces that are illuminated by the high brightness point light source;
based on determining that the one or more of the plurality of color images are higher quality than the one or more of the plurality of corresponding images, replacing the one or more of the plurality of corresponding images stored in the memory with the one or more of the plurality of color images;
capturing data to track location and orientation of the single mobile image capture device for each of the plurality of color images, the captured data comprising photometric data captured under known lighting conditions from the high brightness point light source enabling a pose of the single mobile image capture device to be tracked, wherein the photometric data comprises at least the plurality of color images having been captured for a plurality of poses, each of the plurality of poses comps sing a location and an orientation of the single mobile image capture device; and
transferring the plurality of color images and the captured photometric data to a photometric stereo system to refine the coarse 3D model to create a refined three-dimensional (3D) model of the environment, based at least in part on the replacing of the one or more of the plurality of corresponding images using a photometric stereo process, the refined 3D model comprising surface normals combined with the coarse 3D model,
the refined 3D model of the environment comprising a representation of at least one patch of at least one surface, the representation depicting the at least one patch of the at least one surface with higher quality than in the coarse 3D model of the environment, and the representation of the at least one patch of the at least one surface further depicting at least one material property of the surface, and
the photometric stereo process arranged to use the photometric data to compute the at least one material property of the at least one patch of the at least one surface, the at least one material property comprising information about types of materials within the environment;
wherein the photometric stereo process uses a known approximate relationship between a true color of a patch of a surface in the environment and one or more of the following: a light intensity in the environment, a light direction in the environment, and a surface normal of the at least one patch of the at least one surface in the environment; and
wherein the photometric stereo system is arranged to compensate for an attenuation in the light intensity observed at the patch as a response to the different locations and orientations of the single mobile image capture device with respect to the surfaces, the attenuation depending on at least a distance to the at least one patch of the at least one surface that is illuminated and an angle of a ray of light emitted from the high brightness point light source.

9. The method according to claim 8, further comprising capturing depth images using a depth camera, wherein the depth images and the captured data are used to track the location and the orientation of the single mobile image capture device.

10. The method according to claim 9, further comprising aligning an optical axis of the depth camera with the optical axis of the single mobile image capture device prior to capturing the depth images.

11. The method according to claim 8,
wherein the material property is one or more of the followings true color, lighting, and reflectivity.

12. The method according to claim 11, wherein the depth information provides a distance between the single mobile image capture device and one or more objects in the illuminated scene.

13. The method according to claim 8, further comprising determining the pose of the mobile image capture device while capturing each of the plurality of color images.

14. The method according to claim 13, further comprising obtaining the pose of the single mobile image capture device by one or more of the following: sensed data from an at least one sensor on the single mobile image capture device, and from images captured by the single mobile image capture device.

15. One or more computer-readable storage devices having computer-executable instructions for detecting material properties for three-dimensional environment modeling using a single mobile image capture device, the computer-executable instructions when executed by one or more processors, cause the one or more processors to perform operations comprising:
illuminating an environment using a high brightness point light source;
performing at least one of accessing or generating a coarse three-dimensional (3D) model of an environment, the coarse 3D model of the environment being generated in a 3D volume made up of images stored in memory;
capturing a plurality of color images as the single mobile image capture device moves in the environment, one or more of the plurality of color images corresponding to one or more of the images stored on the memory, the one or more of the plurality of color images depicting surfaces in the environment from different locations and orientations of the single mobile image capture device with respect to the surfaces that are illuminated by the high brightness point light source;

based on determining that the one or more of the plurality of color images are higher quality than the one or more of the plurality of corresponding images, replacing the one or more of the plurality of corresponding images stored in the memory with the one or more of the plurality of color images;

capturing data to track location and orientation of the single mobile image capture device for each of the plurality of color images, the captured data comprising photometric data captured under known lighting conditions from the high brightness point light source enabling a pose of the single mobile image capture device to be tracked, wherein the photometric data comprises at least the plurality of color images having been captured for a plurality of poses, each of the plurality of poses comprising a location and an orientation of the single mobile image capture device; and transferring the plurality of color images and the captured photometric data to a photometric stereo system to refine the coarse 3D model to create a refined three-dimensional (3D) model of the environment, based at least in part on the replacing of the one or more of the plurality of corresponding images using a photometric stereo process, the refined 3D model comprising surface normals combined with the coarse 3D model, the refined 3D model of the environment comprising a representation of at least one patch of at least one surface, the representation depicting the at least one patch of the at least one surface with higher quality than in the coarse 3D model of the environment, and the representation of the at least one patch of the at least one surface further depicting at least one material property of the surface, and the photometric stereo process arranged to use the photometric data to compute the at least one material property of the at least one patch of the at least one surface, the at least one material property comprising information about types of materials within the environment;

wherein the photometric stereo process uses a known approximate relationship between a true color of a patch of a surface in the environment and one or more of the following: a light intensity in the environment, a light direction in the environment, and a surface normal of the at least one patch of the at least one surface in the environment; and wherein the photometric stereo system is arranged to compensate for an attenuation in the light intensity observed at the patch as a response to the different locations and orientations of the single mobile image capture device with respect to the surfaces, the attenuation depending on at least a distance to the at least one patch of the at least one surface that is illuminated and an angle of a ray of light emitted from the high brightness point light source.

16. The one or more computer-readable storage devices of claim 15, wherein the computer-executable instructions further cause the one or more processors to perform operations comprising capturing depth images using a depth camera, wherein the depth images and the captured data are used to track the location and the orientation of the single mobile image capture device.

17. The one or more computer-readable storage devices of claim 16, wherein the computer-executable instructions further cause the one or more processors to perform operations comprising aligning an optical axis of the depth camera with the optical axis of the single mobile image capture device prior to capturing the depth images.

18. The one or more computer-readable storage devices of claim 15, wherein the computer-executable instructions further cause the one or more processors to perform operations comprising:

emitting infrared light to illuminate a scene of the environment; and obtaining depth information from the illuminated scene.

19. The one or more computer-readable storage devices of claim 18, wherein the depth information provides a distance between the single mobile image capture device and one or more objects in the illuminated scene.

20. The one or more computer-readable storage devices of claim 15, wherein the computer-executable instructions further cause the one or more processors to perform operations comprising determining the pose of the single mobile image capture device while capturing each of the plurality of color images using at least one of: sensor data from an at least one sensor on the single mobile image capture device, and from images captured by the single mobile image capture device.

* * * * *